United States Patent
Choi et al.

(10) Patent No.: US 8,261,356 B2
(45) Date of Patent: Sep. 4, 2012

(54) TOOL PACK STRUCTURE AND CONTENTS EXECUTION DEVICE

(75) Inventors: Bum Suk Choi, Daejeon (KR); Young Bae Byun, Seoul (KR); Hyon-Gon Choo, Busan (KR); Sang Hyun Ju, Daejeon (KR); Je Ho Nam, Daejeon (KR); Jin Woo Hong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 876 days.

(21) Appl. No.: 11/910,932

(22) PCT Filed: Apr. 3, 2006

(86) PCT No.: PCT/KR2006/001228
§ 371 (c)(1),
(2), (4) Date: Oct. 8, 2007

(87) PCT Pub. No.: WO2006/107168
PCT Pub. Date: Oct. 12, 2006

(65) Prior Publication Data
US 2008/0201781 A1    Aug. 21, 2008

(30) Foreign Application Priority Data

Apr. 8, 2005 (KR) .......... 10-2005-0029642
Jun. 27, 2005 (KR) .......... 10-2005-0055461

(51) Int. Cl.
*G06F 21/00* (2006.01)
(52) U.S. Cl. ........... 726/26; 380/200; 380/201; 705/59; 726/16; 713/168; 713/170; 713/176; 713/193
(58) Field of Classification Search .............. 726/26
See application file for complete search history.

(56) References Cited

U.S. PATENT DOCUMENTS
7,436,958 B2 * 10/2008 Ji et al. .......... 380/200
(Continued)

FOREIGN PATENT DOCUMENTS
EP    1 370 083 A1    10/2003
(Continued)

OTHER PUBLICATIONS

KIPO Notice of Patent Grant dated May 30, 2008 for the corresponding applications KR 10-2005-0029642, KR 10-2005-0055461.

(Continued)

*Primary Examiner* — Fikremariam A Yalew
(74) *Attorney, Agent, or Firm* — Ladas & Parry LLP

(57) ABSTRACT

A tool pack structure includes: a signature value for guaranteeing authenticity of a tool pack; a tool pack identifier for identifying the tool pack; each unit tool pack provided according to a hardware platform; and tool pack data containing initial values assigned when each unit tool pack is used. Each tool pack includes platform information indicating information about hardware in which the tool pack may be used; a tool agent that is a program activated for content execution; and a tool group including at least one tool program activated by the tool pack agent for processing content according to a predetermined rule. A tool agent leaves operation of a protection tool group used by a specific service provider entirely to a tool agent (execution code) provided together with the tool group by service providers. Accordingly, information about the used tools does not have to be disclosed to the public. Since a user terminal simply calls each tool agent, it can support interoperability with other DRM techniques.

18 Claims, 9 Drawing Sheets

U.S. PATENT DOCUMENTS

| | | | |
|---|---|---|---|
| 7,467,297 B2 * | 12/2008 | Ji et al. | 713/164 |
| 7,610,630 B2 * | 10/2009 | Ji et al. | 726/29 |
| 7,689,823 B2 | 3/2010 | Shen et al. | |
| 2004/0054892 A1 | 3/2004 | Ji et al. | |

FOREIGN PATENT DOCUMENTS

| | | |
|---|---|---|
| EP | 1 370 083 A1 * | 12/2003 |
| EP | 1370 083 A1 * | 12/2003 |
| EP | 1376980 | 1/2004 |
| JP | 2002-082610 | 3/2002 |
| JP | 2002-297451 | 10/2002 |
| JP | 2002-330126 A | 11/2002 |
| JP | 2003-078519 | 3/2003 |
| JP | 2003-199064 A | 7/2003 |
| JP | 2004-005365 A | 1/2004 |
| JP | 2004-007452 A | 1/2004 |
| KR | 1020020089472 | 11/2002 |
| KR | 1020040020175 | 3/2004 |
| KR | 1020040036677 | 4/2004 |
| KR | 1020040056638 | 7/2004 |
| WO | WO03/021965 | 3/2003 |
| WO | 03/067893 A1 | 8/2003 |
| WO | WO03/075576 | 9/2003 |

OTHER PUBLICATIONS

European Search Report: EP 06 73 2795.

B.S. Choi, et al; "ETRI Submission for SAV CfP—Tool Agent;" The Digital Media Project.

GA09, "Approved Document No. 2—Technical Reference: Architecture;" The Digital Media Project.

GA09; "Approved Document No. 3—Technical Specfication: Interoperable DRM Platform;" The Digital Media Project.

* cited by examiner

[Figure 1]
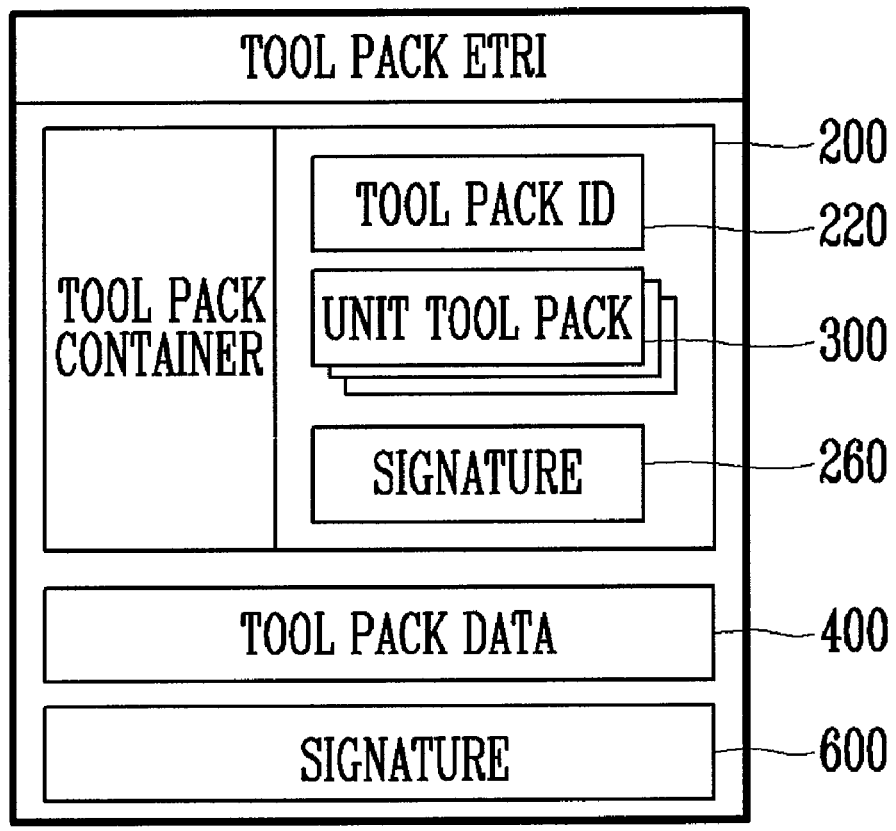
[Figure 2]
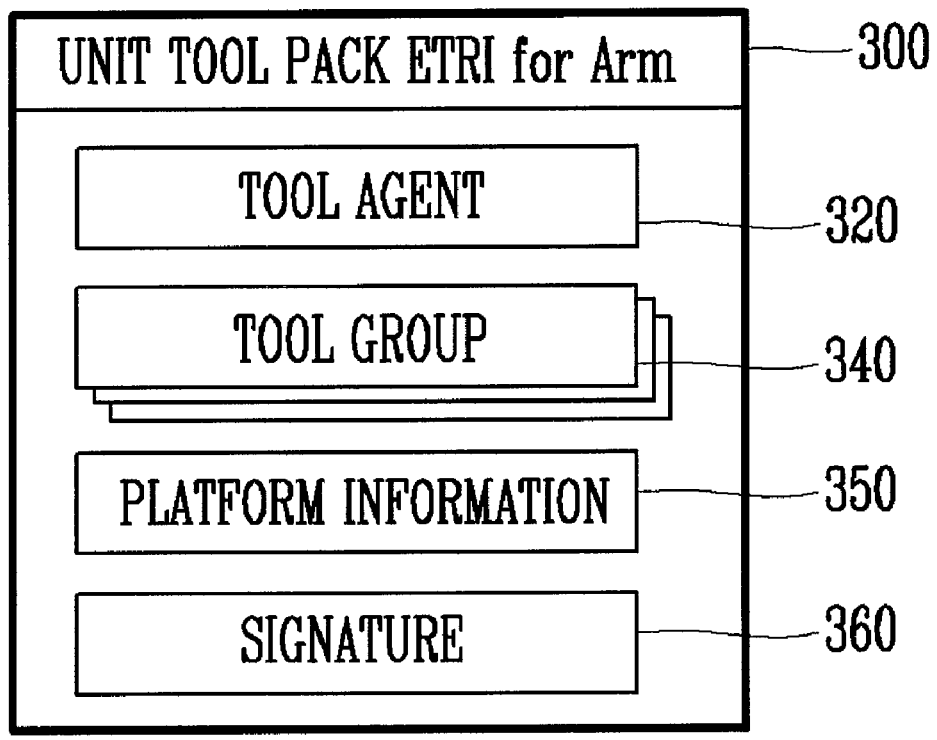

[Figure 3]
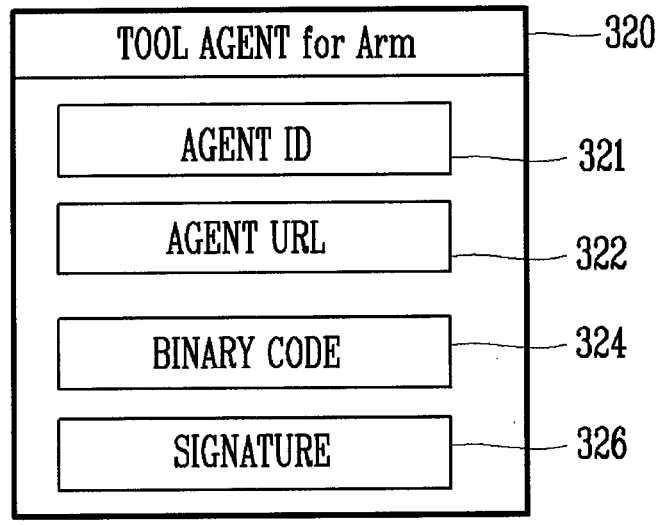
[Figure 4]
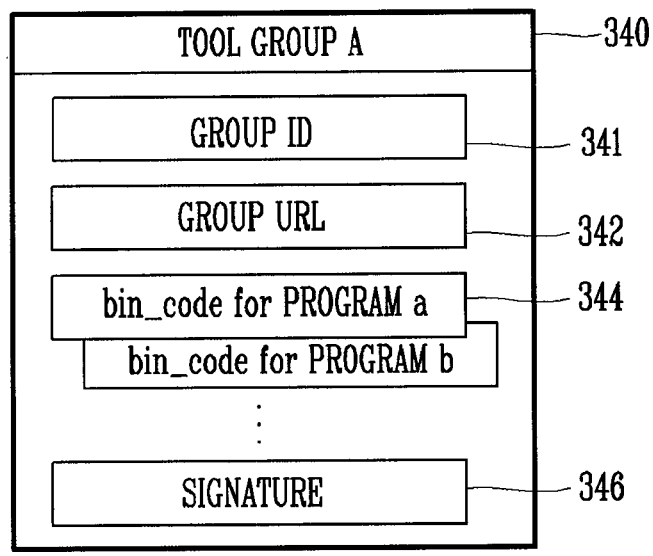
[Figure 5]
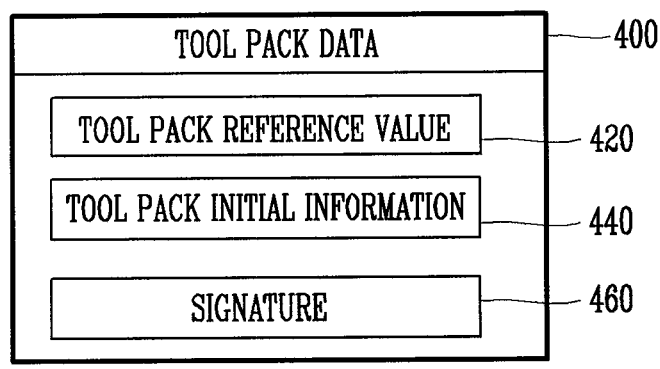

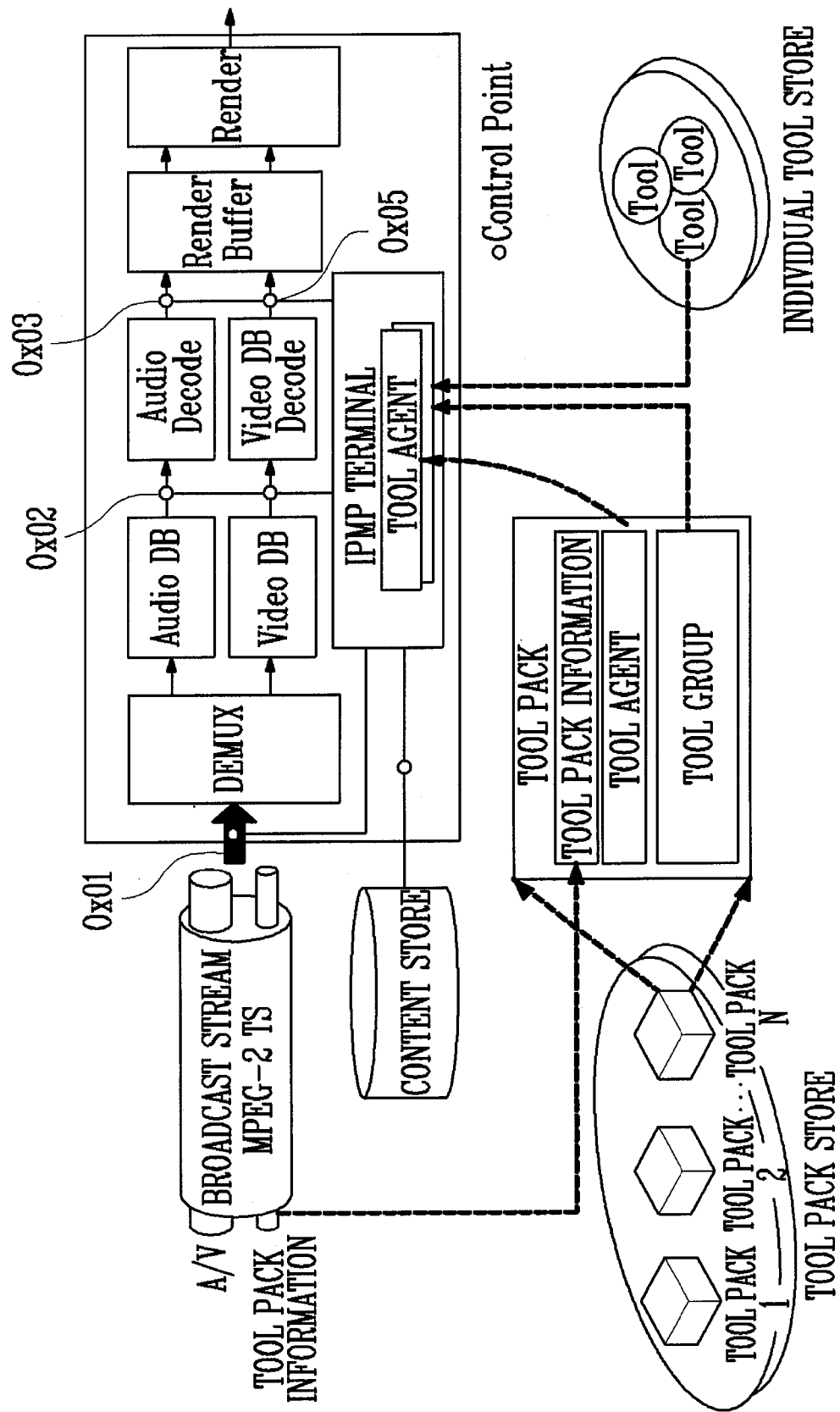
【Figure 6】

【Figure 7】
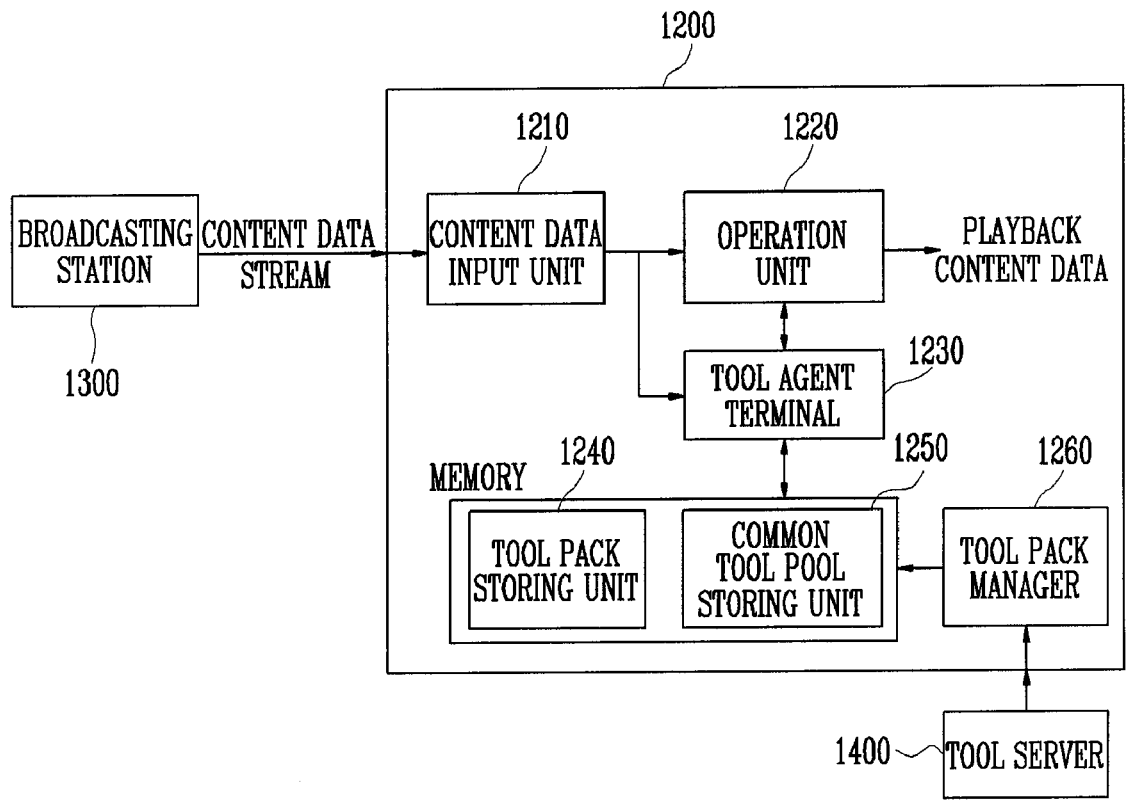
【Figure 8】
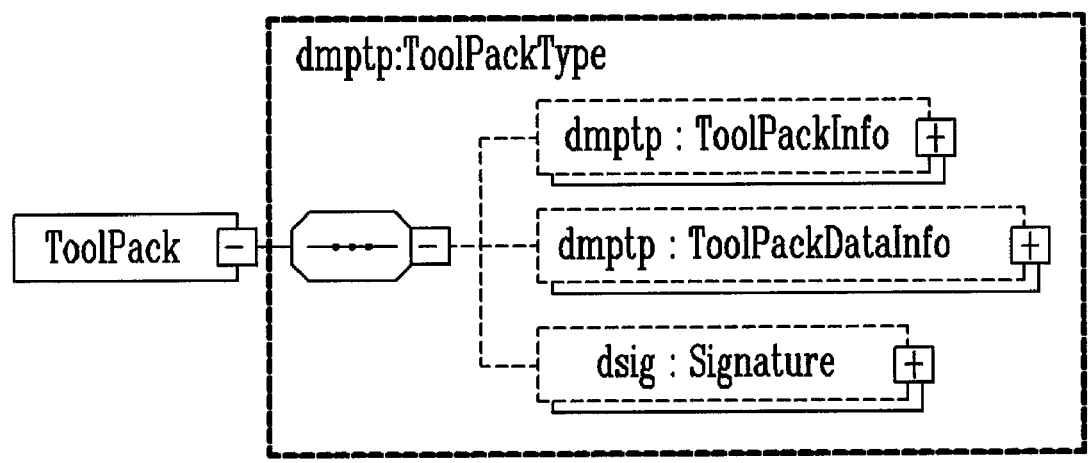

[Figure 9]
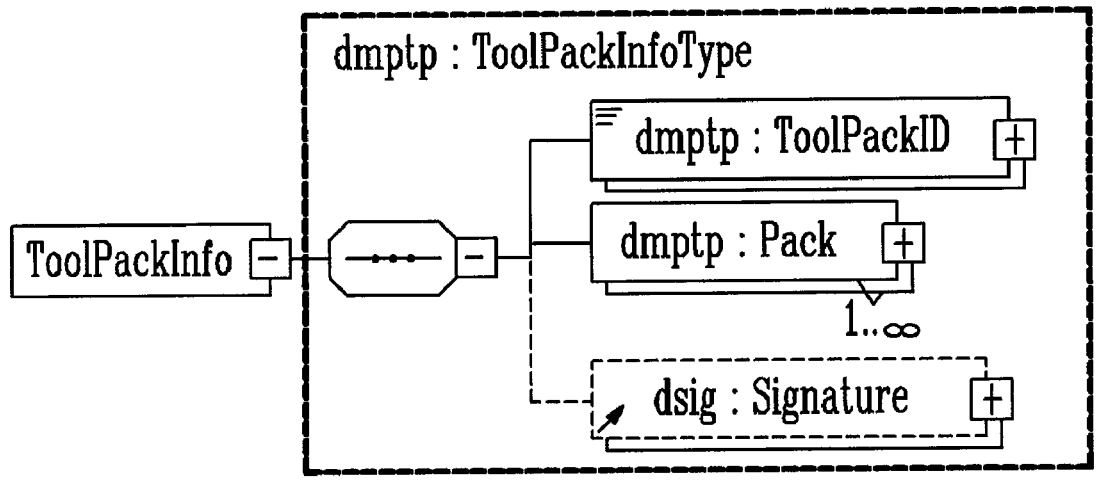
[Figure 10]
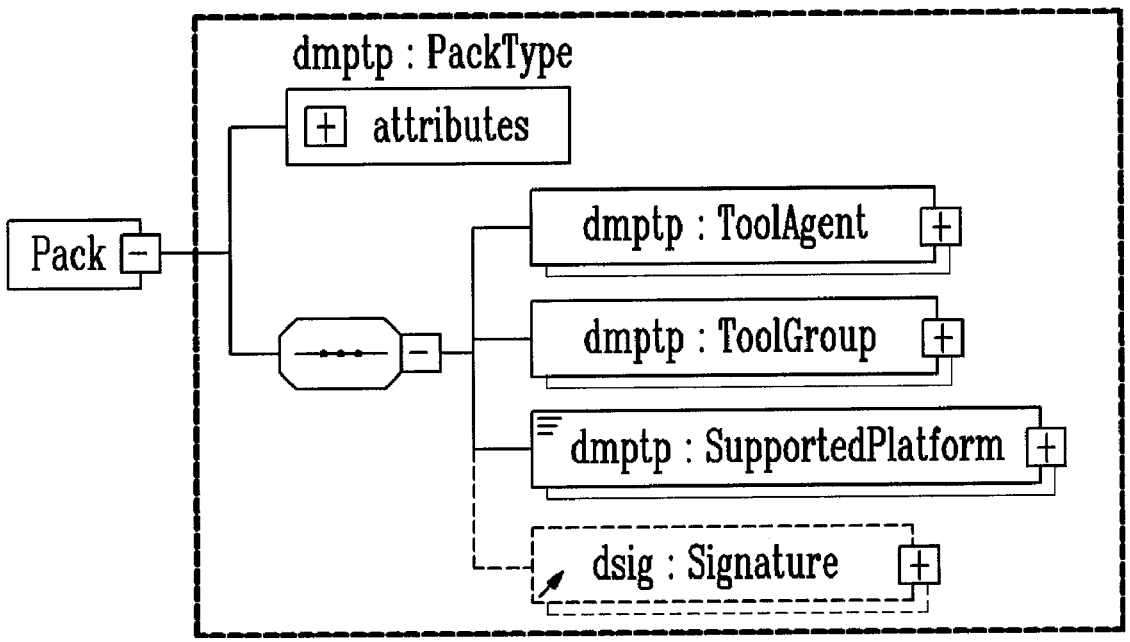

[Figure 11]
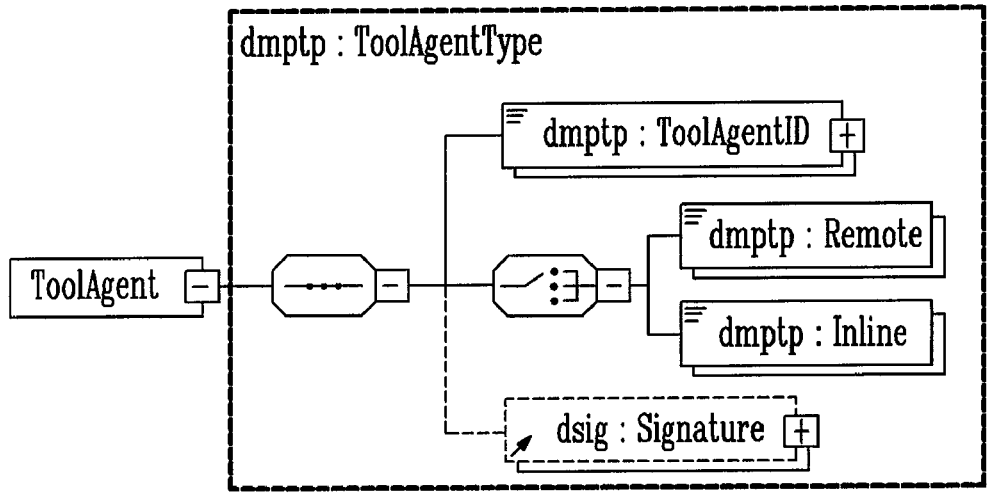
[Figure 12]
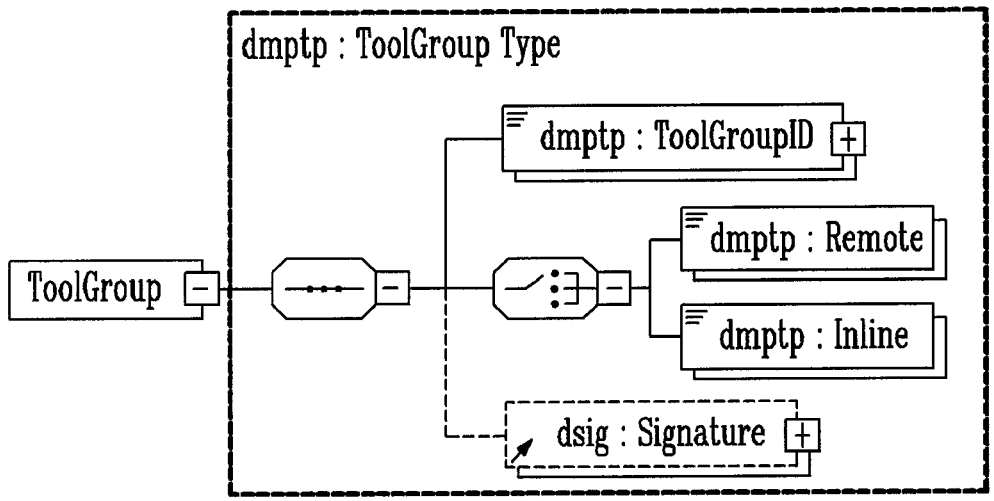
[Figure 13]
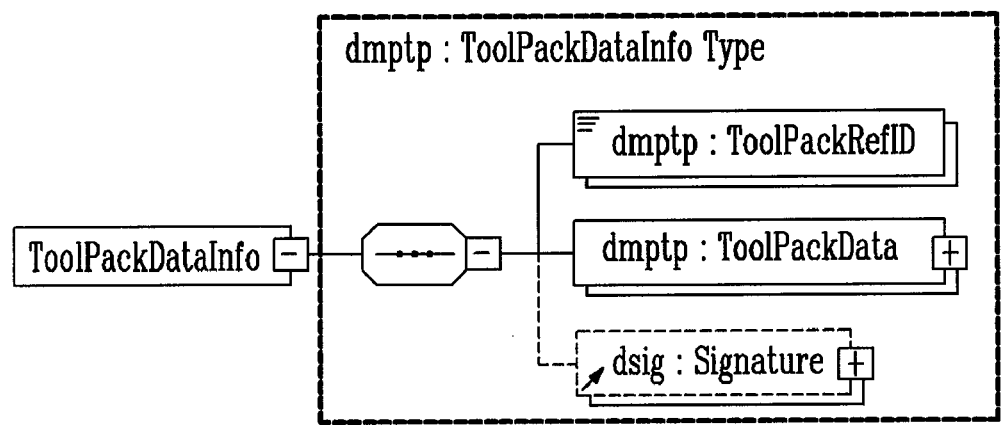

【Figure 14】
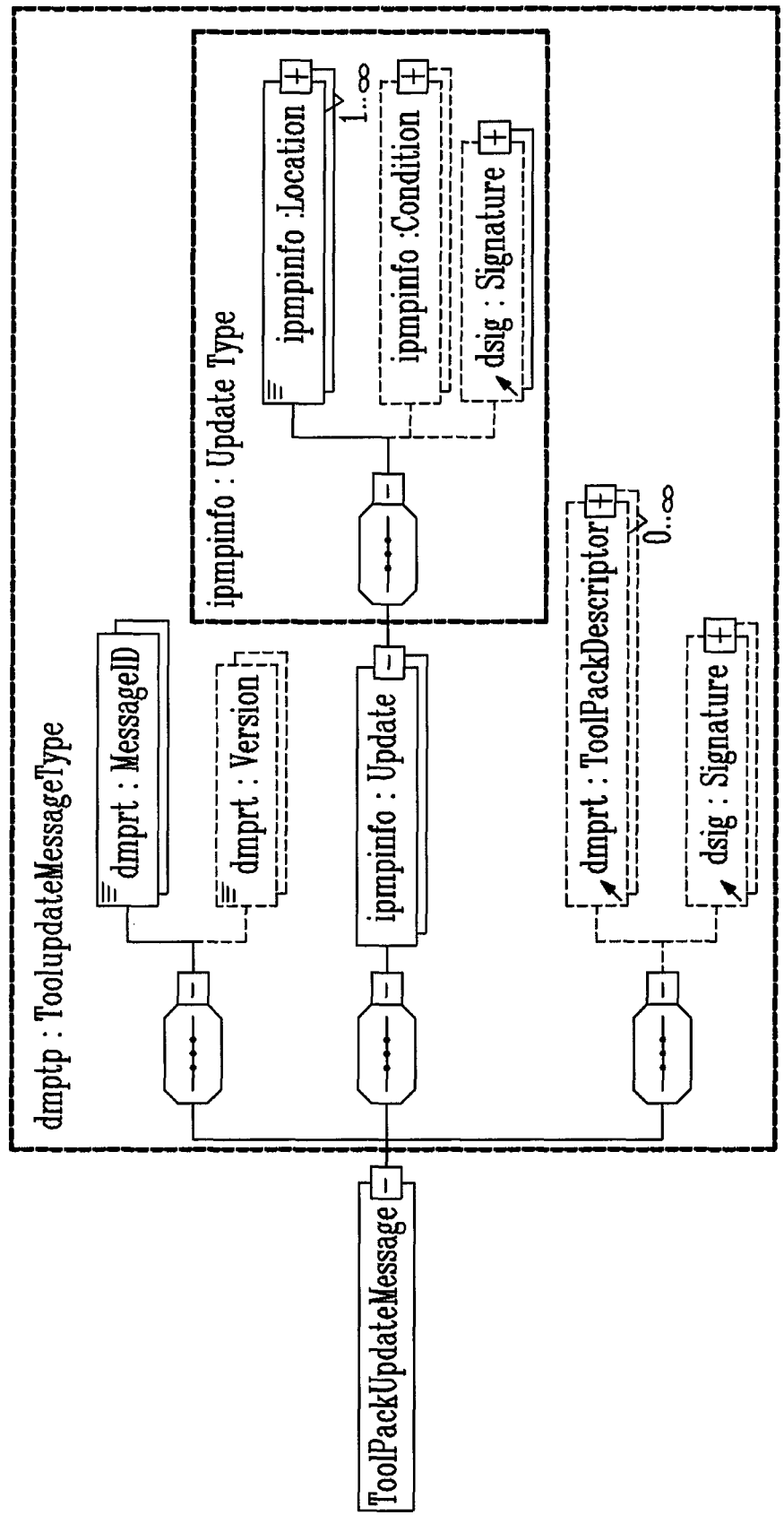

[Figure 15]
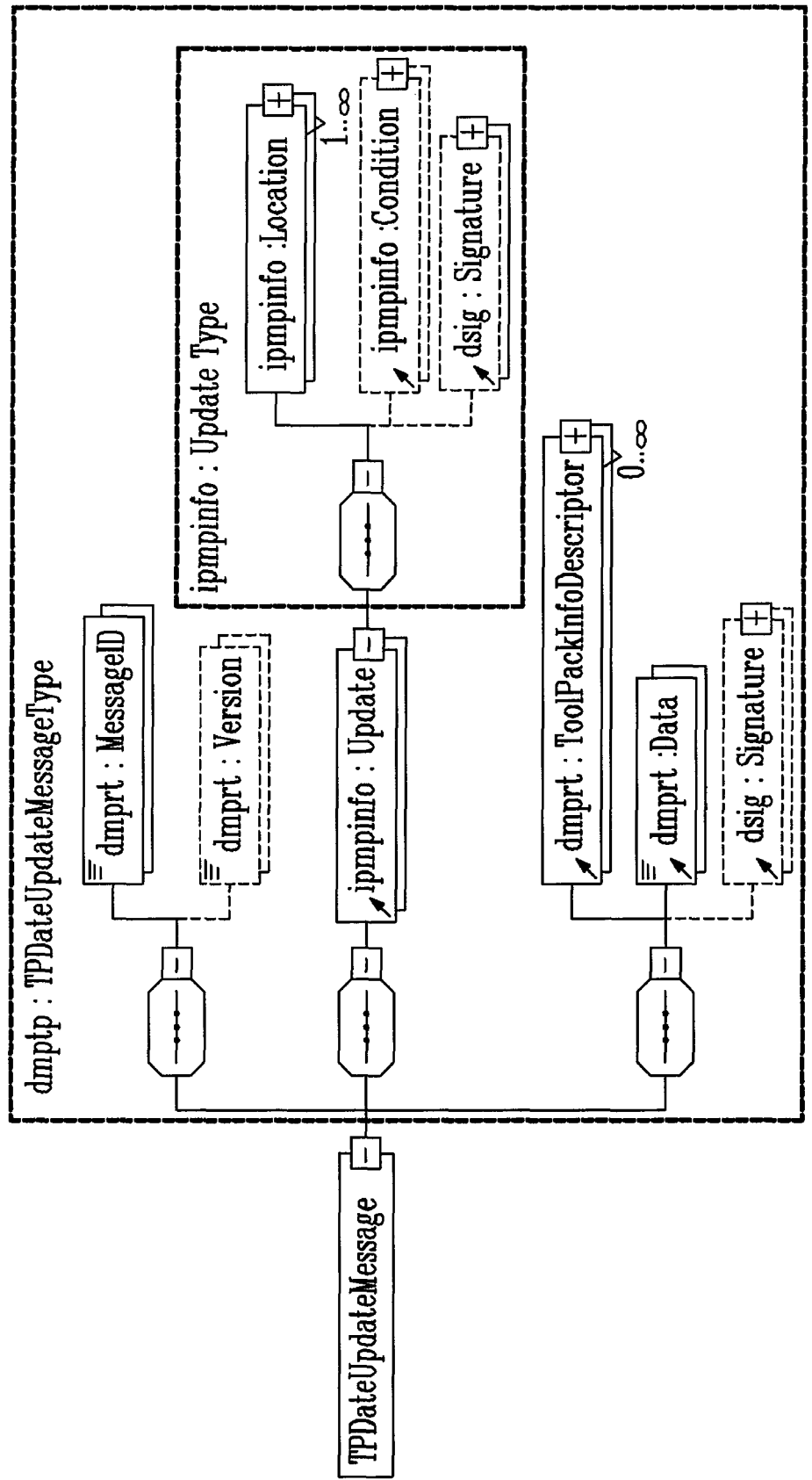

[Figure 16]
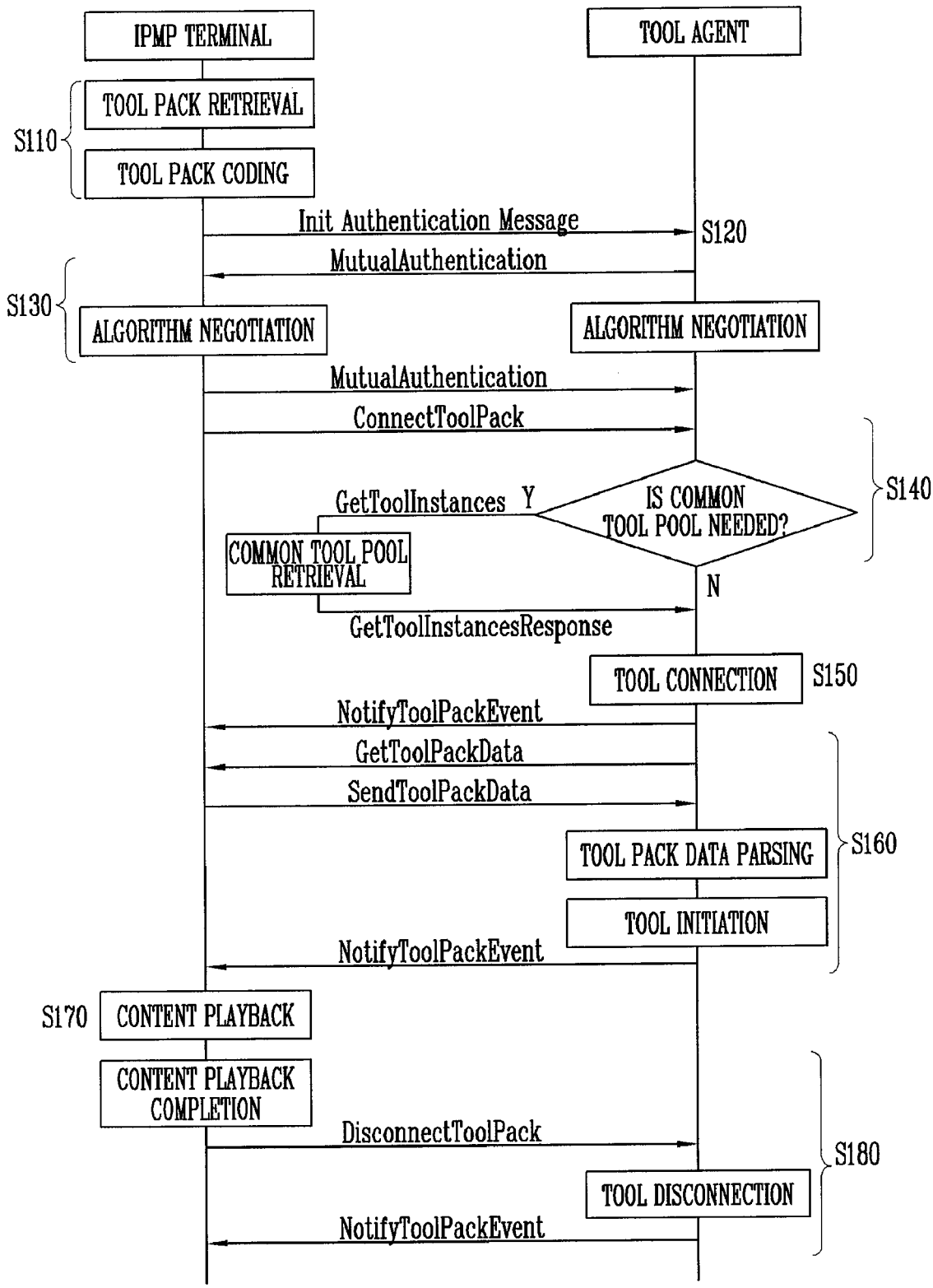

TOOL PACK STRUCTURE AND CONTENTS EXECUTION DEVICE

TECHNICAL FIELD

The present invention relates to a content execution device for executing content data such as multimedia stream data, and to a package structure of an Intellectual Property Management and Protection (IPMP) tool stored in the content execution device.

BACKGROUND ART

An Intellectual Property Management and Protection (IPMP) tool is an object module having a content protection function such as authentication, encryption, watermarking and the like, and processes media data, and critical data such as key information. Accordingly, most service providers own dedicated IPMP tools and are reluctant to release information about the tools (functions, API, etc.) to the public.

The broad definition of an IPMP tool includes an IPMP tool for concealing data in a secure format to protect a copyright or guaranteeing data authenticity, and an encoder/decoder tool for simply encoding/decoding data in a specific format in order to give various multimedia effects to content data or increase compression/transmission efficiency. Information about the encoder/decoder tool (functions, API, etc.) may be made available to the public. The IPMP tool referred to herein is to be interpreted in the broad sense of the term.

Meanwhile, each broadcasting station applies at least one IPMP tool to its broadcast content in order to protect the broadcast content and/or give various multimedia effects to the broadcast content. A group of IPMP tools needed to provide such specific broadcasting service is defined as a tool group.

Each broadcasting station processes bare data of broadcast content using selected tools to generate a content packet, and transmits it to each user via a transmitting means. The content packet is finally delivered to a content player of the user. For example, it is assumed that broadcasting station A forms a content packet using tools a, b and c, and broadcasting station B forms a content packet using tools c, d, e and f. The content conforms to the MPEG-2 standard, and the content player has an IPMP terminal according to the MPEG-2 standard.

In this case, because each broadcasting station uses individual tools to protect content, the IPMP terminal needs to recognize all interface messages which may differ for the individual tools in order to guarantee interoperability. That is, if a new tool is developed and a new interface message for the tool is necessary, a conventional IPMP terminal should be greatly changed.

Further, when the IPMP terminal desires to use individual tools, it needs to recognize information about the tools, information indicating a control point where the tools operate, and information about functions of the tools (generally, disclosed to the public through an interface message).

However, while designers of content execution devices would like to have tool specifications disclosed to the public, tool developers oppose such public disclosure because it degrades security of the tools. This is because, when a number of tools are applied to one type of content, the tools themselves and a time point at which each tool is applied are exposed, and if each tool is easily hacked, the security of a final content packet is greatly degraded. Accordingly, there is an antinomic problem between content execution device designers and tool developers.

Further, the content execution device needs to have the tools a, b and c in order to execute the content of broadcasting station A, and the tools c, d, e and f in order to execute the content of broadcasting station B. Thus, it is necessary to access each broadcasting station on occasion, check whether there is a change in a used tool group, and adjust the tools of the content execution device according to the changed tool group. There are a great number of multimedia encoding/decoding tools and security tools. Accordingly, since content players require many tools, manufacturing cost increases and users are occasionally required to update tools of each broadcasting station.

DISCLOSURE

Technical Problem

The present invention is directed to a tool pack structure capable of securing a sufficient general-purpose feature while concealing the structure of a tool needed to execute content.

The present invention is also directed to a tool pack structure capable of improving security of content packets.

The present invention is also directed to a tool pack structure including a tool agent capable of reducing an amount of tool data stored in a content execution device.

The present invention is also directed to a tool pack structure including a tool agent capable of providing convenience to content users.

Technical Solution

One aspect of the present invention provides a tool pack structure comprising: a signature value for guaranteeing authenticity of a tool pack; a tool pack identifier for identifying the tool pack; at least one unit tool pack; and tool pack data containing initial values assigned when each unit tool pack is used.

Each unit tool pack includes unit tool pack information; a tool pack agent that is a program activated for content execution; and a tool group including one or more tool programs activated by the tool pack agent for processing the content according to a predetermined rule.

Preferably, each unit tool pack is provided according to a hardware platform. In this case, the unit tool pack information is platform information indicating information about hardware in which a unit tool pack can be used.

Another aspect of the present invention provides a content execution device for receiving content data of a predetermined format, converting the content data according to the format, and executing the content, the device comprising: a tool agent executer for activating a tool agent corresponding to the type of content data to be processed; and a tool pack storage unit for storing a tool program code activated by the tool agent for processing the content data according to a unique rule and a program code of the tool agent.

Still another aspect of the present invention provides a method for executing content data comprising the steps of: determining and retrieving a tool pack to be used based on the type of the content data to be executed; activating a tool agent of the tool pack; leaving an execution task to the tool agent when a task performed by the tool agent reaches a necessary control point during the execution of the content data; and receiving execution result data from the tool agent and performing a subsequent task.

Advantageous Effects

With a tool pack structure and a content execution device according to the present invention, it is possible to provide convenience to content users and/or improve security of content packets.

According to the present invention, a tool agent entirely leaves operation of a protection tool group used by a specific service provider to a tool agent (execution code) provided together with the tool group by the service provider. Accordingly, information about the used tools does not have to be disclosed to the public. Since a user terminal simply calls each tool agent, it can support interoperability with other DRM techniques.

DESCRIPTION OF DRAWINGS

FIG. 1 is a block diagram illustrating a tool pack structure according to an exemplary embodiment of the present invention;

FIG. 2 is a block diagram illustrating a unit tool pack structure in FIG. 1 according to an exemplary embodiment of the present invention;

FIG. 3 is a block diagram illustrating a tool agent structure in FIG. 2 according to an exemplary embodiment of the present invention;

FIG. 4 is a block diagram illustrating a tool group structure in FIG. 2 according to an exemplary embodiment of the present invention;

FIG. 5 is a block diagram illustrating a tool pack data structure including an initial value of a tool pack structure according to an exemplary embodiment of the present invention;

FIG. 6 is a block diagram illustrating content execution blocks of a content execution device according to an exemplary embodiment of the present invention;

FIG. 7 is a block diagram illustrating hardware blocks of a content execution device according to an exemplary embodiment of the present invention;

FIGS. 8 to 13 illustrate a schema structure in which a tool pack structure is implemented in XML according to an exemplary embodiment of the present invention;

FIG. 14 illustrates a schema structure in which a tool pack update message structure that may be used to update a tool pack is implemented in XML according to the present invention;

FIG. 15 illustrates a schema structure in which a tool pack data update message structure that may be used to update tool pack data is implemented in XML according to the present invention; and FIG. 16 is a flowchart illustrating a message communication structure of a tool agent and an IPMP terminal according to the present invention.

MODE FOR INVENTION

Hereinafter, exemplary embodiments of the present invention will be described in detail. However, the present invention is not limited to the exemplary embodiments disclosed below, but can be implemented in various modified forms. Therefore, the present exemplary embodiments are provided for complete disclosure of the present invention and to fully inform the scope of the present invention to those ordinarily skilled in the art.

Encoding/decoding described below does not mean encoding/decoding in a narrow sense implying compression/decompression. Herein, encoding refers to all processes of converting object data according to a predetermined algorithm, and decoding refers to all processes of obtaining original object data by applying a predetermined inverse-algorithm to the converted data.

Exemplary Embodiment 1

In this exemplary embodiment, the spirit of the present invention is applied to a content broadcasting system conforming to the MPEG2 specification (ISO/IEC JTC 1/SC 29). In a tool pack structure of this exemplary embodiment, a tool agent can be parsed and executed by an IPMP terminal on the MPEG2 specification.

According to this exemplary embodiment, a specific tool pack for a specific broadcasting service may include a number of unit tool packs according to a hardware platform of each multimedia device. In one tool pack, all the unit tool packs simply have different binary codes according to a hardware specification but preferably have the same interface specification.

FIG. 1 illustrates a tool pack structure according to an exemplary embodiment of the present invention. The tool pack structure includes a signature value 600 for guaranteeing authenticity of a tool pack; a tool pack identifier 220 for identifying the tool pack; unit tool packs 300 corresponding to a hardware platform; and tool pack data 400 containing initial values assigned when each unit tool pack is used.

The shown structure includes a tool pack container 200 for storing each unit tool pack 300. The tool pack identifier 220 may be included in the tool pack container 200.

FIG. 8 illustrates an XML schema structure implementing such a tool pack structure. Table 1 illustrates elements of the XML schema structure. In FIG. 8 and Table 1, the tool pack container is indicated by ToolPackInfo, the tool pack data is indicated by ToolPackDataInfo, and the signature value is indicated by Signature. The tool pack having the shown schema may be parsed by an IPMP terminal.

TABLE 1

| Element Name | Description |
| --- | --- |
| ToolPackInfo | Element including a tool pack ID, a tool agent, and a tool group |
| ToolPackDataInfo | Element including information for initializing a tool agent |
| Signature | Element for authentication and integrity confirmation for a tool pack schema |

The tool pack container 200 may further include a signature value 260 for guaranteeing authenticity of the tool pack container. FIG. 9 illustrates an XML schema structure which implements the tool pack container structure including the signature value 260. Table 2 illustrates elements of the XML schema structure. In FIG. 9 and Table 2, the tool pack container is indicated by ToolPackInfo, the tool pack data is indicated by ToolPackDataInfo, and the signature value is indicated by Signature.

TABLE 2

| Element Name | Description |
| --- | --- |
| ToolPackID | This denotes an identifier (ID) of a tool pack. The ID is issued by a tool registration server when a tool pack is registered in the tool registration server. |
| Pack | Element including a tool agent and a tool group according to a platform. One or more packs may exist. |
| Signature | Element for authentication and integrity confirmation for ToolPackInfo |

FIG. 2 illustrates a unit tool pack structure according to an exemplary embodiment of the present invention. The shown unit tool pack structure includes platform information 350 indicating information about hardware in which a unit tool pack 300 can be used; a tool agent 320 that is a program activated for content execution; and a tool group 340 including one or more tool programs for processing content according to a predetermined rule and activated by the tool agent 320.

As shown in FIG. 2, the unit tool pack structure preferably includes a signature value 360 for guaranteeing authenticity of the tool pack data packet in the structure of the unit tool pack 300 (which is generated by a right holder to indicate that there is no forgery/falsification).

FIG. 10 illustrates an XML schema structure implementing the unit tool pack structure. In FIG. 10, the tool agent is indicated by a ToolAgent, the tool group is indicated by ToolGroup, platform information is indicated by SupportedPlatform, and the signature value is indicated by Signature.

Preferably, the tool agent 320 is provided to every tool pack. Preferably, a specification of call interface and/or parameter, return variable and the like is disclosed to the public for convenience of external devices or application program producers which handle content data encoded by the tool pack. The tool agent 320 is preferably activated in advance when content data needing the tool pack is to be executed. The tool agent may be performed by a predetermined IPMP terminal on the content execution device, as previously mentioned.

The tool agent as shown in FIG. 3 may further include an agent identifier (ID) 321 for identifying the tool agent; a remote pointer (URL) 322 indicating an location from which the tool agent can be downloaded; and a binary code 324 that is an execution code of the tool agent. Further, the tool agent may further include a tool agent signature value 326 capable of guaranteeing authenticity of the tool agent 320.

FIG. 11 illustrates an XML schema structure implementing the tool agent structure. Table 3 illustrates elements of the XML schema structure. In FIG. 11 and Table 3, the agent identifier is indicated by ToolAgentID, a remote pointer is indicated by Remote, a binary code is indicated by Inline, and the signature value is indicated by Signature.

TABLE 3

| Element Name | Description |
| --- | --- |
| ToolAgentID | This denotes an identifier (ID) of a tool agent. This ID is arbitrarily defined by a tool agent developer. |
| Remote | This denotes a URL of a remote server to be accessed in order to download a tool agent. |
| Inline | This includes a binary code for a tool agent. |
| Signature | Element for authentication and integrity confirmation for ToolAgent |

The tool group as shown in FIG. 4 may include a group identifier (ID) 341 for identifying a tool group; a remote pointer (URL) 342 indicating a location from which the tool group can be downloaded; and a binary code 344 that is an execution code of a tool program in the tool group.

FIG. 12 illustrates an XML schema structure implementing the tool group structure. Table 4 illustrates elements of the XML schema structure. In FIG. 12 and Table 4, the tool group identifier is indicated by ToolGroupID, the remote pointer is indicated by Remote, the binary code is indicated by Inline, and the signature value is indicated by Signature.

TABLE 4

| Element Name | Description |
| --- | --- |
| ToolGroupID | This denotes an identifier (ID) of a tool group. This ID is arbitrarily defined by a tool group developer. |
| Remote | This denotes a URL of a remote server to be accessed in order to download a tool group. |
| Inline | This includes a binary code of a tool group. |
| Signature | Element for authentication and integrity confirmation for a tool group |

The tool program is for an individual encoding/decoding process. The activated tool agent may call at least one tool program while performing a needed task and leave a necessary encoding/decoding process to the tool program. However, since the tool agent is called on an external device or application program handling encoded content data, associated producers preferably recognize a specification including a call interface and/or parameter, return variable and the like for the tool agent. The tool program, however, is called only by the tool agent. Accordingly, when the specification including the call interface and/or parameter, return variable, and the like for the tool program is protected by not disclosing it to the public, it is possible to obtain enhanced security against content data conversion while not inconveniencing external devices or application program related producers.

Meanwhile, tool programs in the tool pack may include all undisclosed tool programs and all disclosed tool programs used by the tool agent, or may not include some of the disclosed tool programs. The latter provides somewhat inferior security to the former, but storage efficiency of tool pack data can be enhanced by separately storing a disclosed tool program that is likely to be used at a number of tool packs in an overlapping manner. To this end, the latter needs to further have a common tool pool structure that is a group of one or more tool programs containing a disclosed execution specification such as the call interface and/or parameter, return variable and the like.

The tool pack structure may be stored and used in a storage medium such as an execution memory and/or a storage memory, which are provided in the tool server for generating and downloading the tool pack and the content execution device for executing content.

Meanwhile, the tool agent and the tool program that are execution programs included in the tool pack may be implemented to be always called with the same initial state (i.e., a reset state). Alternatively, the tool agent and the tool program may be implemented to be called with an initial value that is changed whenever they are called or with an initial value downloaded from, for example, an external authorized tool server in order to provide more enhanced security.

The tool pack data structure shown in FIG. 5 includes a signature value 460 for guaranteeing authenticity of a tool pack data 400; a tool pack reference value 420 indicating a tool pack to which the tool pack data is applied; and initial tool pack information 440 containing initial values assigned when the tool pack is activated. The tool pack reference value 420 indicates a tool pack to which the stored initial value is applied and may include an ID value of the tool pack.

The tool pack data 400 structure includes only an initial value for the tool agent when only the tool agent is called with the initial value, only initial values for at least one tool program when the tool program is called with the initial value, and initial values for the tool agent and the tool program when both the tool agent and the tool program are called with the initial values.

When the initial values are changed each time the tool agent and/or tool program is called, corresponding initial value data is changed on an initial tool pack data structure each time the tool agent and/or tool program is called or terminated. When the initial values are updated by an external tool server, they are updated to a new tool pack data block downloaded from the tool server when an update condition such as a period of time is satisfied.

Meanwhile, a content execution device 1200 storing a tool pack structure receives content data of a predetermined format, converts it according to the format, and executes content, as shown in FIG. 7. The content execution device 1200 includes a tool agent executer 1230 for activating a tool agent according to the type of content data to be processed; and a tool pack storage unit 1240 for storing a program code of the tool agent, and at least one tool program code activated by the tool agent for processing the content data according to a unique rule.

An example in which the content execution device is implemented by a content playback terminal will be described. The content execution device 1200 includes a control device (CPU) 1220 for controlling its general operation. The control device 1220 loads an execution program from a storage memory into an execution memory to execute the program. The control device 1220 may be implemented to serve as the tool agent executer 1230. In this case, the control device 1220 retrieves a tool pack from the tool pack storage unit 1240 based on the type of input content data, confirms a signature value appended to the tool pack if necessary, loads a tool agent program from the retrieved tool pack into the execution memory to activate (call) the tool agent program, and delivers a necessary parameter. When the device is compatible with the MPEG2 standard, these tasks may be performed by an IPMP terminal.

The called tool agent calls a necessary tool program while performing scheduled processing on input commands and parameters. The called tool program is loaded and activated in the execution memory. A result obtained by receiving the necessary parameters from the tool agent and performing the scheduled processing returns to the tool agent. After completing processing using one or more tool programs, the tool agent delivers the processing result to the control device 1220 and terminates the operation.

Accordingly, the tool pack storage unit 1240 in the content execution device may be a storage medium in which the above-described tool pack structure is stored. For example, when the tool pack structure includes a tool pack data block structure having initial values of the tool agent and/or tool programs, a field for recording the tool pack data block is further added to the tool pack storage unit 1240, as shown in FIGS. 1 to 5. Further, when the tool pack structure includes the common tool pool as described above, the content execution device 1200 further comprises a common tool storage unit 1250 for storing a common tool program having a disclosed code execution specification and processing content data according to a unique rule.

The content execution device 1200 may further include a content data input unit 1210 for receiving content data through an online cable such as the Internet, and a movable data storage medium such as a memory stick. In this case, the tool agent executer 1230 determines a desired tool pack from the tool pack information in the received content data.

The content execution device 1200 downloads the tool pack from the tool server 1400 and stores it in the tool pack storage unit 1240. The content execution device 1200 may further include a tool pack manager 1260 for updating the stored tool pack. The control device 1220 may serve as the tool pack manager 1260.

The tool server 1400 includes a tool registration server and a tool management server. The tool registration server is a system performing a task for registering a used tool from each broadcasting station. The tool management server is a system for distributing the tool pack to a content player device of each user. An authority having the tool registration server may include the tool management server. Other places such as a broadcasting station may include the tool management server. Alternatively, the tool registration server and the tool management server may be composed as one server. Hereinafter, the tool server and the tool management server are collectively called a tool server.

As described above, the tool pack structure of the present invention is used on a content service system including a tool server 1400 for generating and downloading a tool pack, and a content execution device 1200 for storing the tool pack and using it upon executing the content. Methods using the tool pack structure in the system will now be described.

First, a broadcasting station needs to register a tool pack to be applied to the service in the tool server. When the broadcasting station requests the tool server to register a tool group and a tool agent to be used together with related information, the tool server generates hash values for the tool group and the tool agent, and issues a tool pack ID uniquely identifying the tool pack. The tool server generates a tool pack header (Tool-Pack_Info schema) containing the tool pack information and the tool pack ID provided by the broadcasting station and the hash values of the tool group and the tool agent, and affixes a signature to the tool pack header using a private key of the tool server. Finally, the tool server groups the tool pack header, the tool group, and the tool agent as a tool pack (ToolPack schema), and delivers the tool pack to the broadcasting station, completing the tool pack registration procedure.

After completing the tool pack registration procedure, the tool pack needs to be uploaded to the tool server to be used by other devices. Upon receipt of a tool pack upload request, the tool server manages the tool pack header information and the binary tool pack in a DB form.

When the user requests service for the first time, the broadcasting station authenticates the user and then notifies the content execution device 200 of the position of the tool server 400 and the tool pack ID. The content execution device 200 requests the tool server 400 to provide a necessary tool pack, and the tool server 400 retrieves the requested tool pack and transmits it to the content execution device. That is, the content execution device 200 connects to the tool server 400 and requests the tool server 400 to transmit a tool pack corresponding to the tool pack identifier, and the tool server 400 retrieves the requested tool pack from an internal tool pack DB and transmits it to the content execution device 200. In this case, the tool server 400 may transmit it together with its own public key so that tool pack authentication is confirmed.

The IPMP terminal calls and parses tool pack information (ID, version, etc.) needed for broadcast content consumption from the broadcast stream, loads the necessary tool pack, and calls the tool agent. When the tool agent is called, the IPMP terminal provides tool pack data containing information for initializing tools and a list of control points available to the device, to the tool agent.

If the user simultaneously calls different functions with respect to at least one different service channel, he/she can call all tool agents of the tool pack for each service channel. For example, when general viewing operation is selected for an ETRI service channel, and at the same time, a recording operation is selected for a channel KBS, a tool agent for the ETRI service channel and a tool agent for the KBS service channel are simultaneously called and a proper tool operates for each function selected by the user.

The tool agent calls necessary tools from the tool group that it manages, initializes the tools using the tool pack data, and connects the tools to a proper control point. If the necessary tools do not exist in the tool group, the tool agent requests the IPMP terminal to retrieve the necessary tools. The IPMP terminal retrieves the requested tools from the common tool pool. When the tools exist, the IPMP terminal delivers a corresponding tool instance to the tool agent. The tool agent initializes the tools using the delivered tool instance and connects the tools to the control point.

If the necessary tool pack does not exist in the content execution device, the IPMP terminal connects to the tool server using tool pack header information and downloads the necessary tool pack. If the necessary tools do not exist in the common tool pool of the content execution device, the IPMP terminal connects to the tool server to download the necessary tools.

To update a tool in the content execution device, a scheme of updating a tool through a broadcast stream and a scheme of updating a tool through a remote tool server are used. The tool pack or the common tool becomes an update object. When the update is made through the broadcast stream, a tool pack update message or a tool update message together with a broadcast stream is transmitted, and the IPMP terminal performs tool update through the message. The tool may be immediately updated by including a binary tool pack or tool in the tool update message. Only information about the tool pack or the tool may be recorded in the tool update message. In this case, the IPMP terminal may access the tool server and download the necessary tool pack or tool.

Meanwhile, the IPMP terminal may perform authentication on the tool pack to confirm whether the tool pack is lawful, in operating a tool program through the tool agent or control device. In this case, the content execution device request a certificate of the tool pack and confirms the signature of the tool pack using a public key input from the tool server.

The control point refers to a point that the IPMP tools can apply in each step of processing the content for several ways of utilizing content (playback, storage, transmission, etc.) when the content is input to the content execution device. For example, in a set-top box consuming broadcast content, a control point can be defined on the content process flow of FIG. 6, as shown in Table 5.

TABLE 5

| Control Point | Description |
| --- | --- |
| 0x00 | No control point |
| 0x01 | Control point before demultiplexing |
| 0x02 | Control point before audio decoding |
| 0x03 | Control point after audio decoding |
| 0x04 | Control point before video decoding |
| 0x05 | Control point after video decoding |
| 0x06~0x10 | Reserved |
| 0x11~0x19 | Control point before storing |
| 0x20 | Reserved |
| 0x21~0x29 | Control point before playback |
| 0x30 | Control point before transferring |

Exemplary Embodiment 2

In this exemplary embodiment, an example of an interface message stricture between the content execution device and the tool agent for allowing the tool pack structure of the first exemplary embodiment to be smoothly used in the content execution device as shown in FIG. 6 will be described.

In this exemplary embodiment, the content execution device (control device) communicates with the tool agent through a standardized interface message. A data object structure of the interface message according to an exemplary embodiment is as follows: It is assumed that the content execution device is composed of a broadcast receiving set-top box and a playback terminal.

```
Aligned(8) expandable(2^28−1)Class MessageBase{
bit(8) Version;
bit(32) Msg_ID;
bit(16) Sender;
bit(16) recipient;
}
```

When a broadcast content stream is input to the set-top box, the playback terminal can confirm a signature of a tool pack indicated by a tool pack identifier on the content stream, call a corresponding tool agent, and deliver information for initializing the tool agent.

```
Class InitializeToolAgentMessage extends MessageBase
: bit(8) tag = InitializeToolAgentMessage_tag
{
ByteArray IPMPTerminalInstance;
bit(8)numControlPoints
for(i=0;i<numControlPoints;i++){
bit(8)ControlPointType;
ByteArray ControlPointAddress;
}
ByteArray Data;
}
```

When a tool program needed to use content does not exist in the tool group, the tool agent can request the playback terminal to retrieve a common tool pool.

```
Class GetToolInstances extends MessageBase
: bit(8) tag = GetToolInstances_tag
{
bit(8)numTools;
for(i=0;i<numTools;i++){
bit (128) ToolID;
}
}
```

The playback terminal can retrieve the requested tool program from the common tool pool in response to the tool agent's request to retrieve the common tool pool, and respond with the result to the tool agent.

```
Class GetToolInstancesResponse extends MessageBase
: bit(8) tag = GetToolInstancesResponse_tag
{
bit(8)numTools;
for(i=0;i<numTools;i++){
ByteArray ToolInstance;
}
}
```

Meanwhile, a update message instructing to update pool pack related data which is stored in the playback terminal may include a tool pack update message for updating a tool pack, a common tool update message for updating a common tool, and a tool pack initial value update message for updating an initial value block for operating tools. These messages may be delivered over a broadcasting channel or a network. Exemplary embodiments of the messages are as follows:

| Syntax | No. of bits | Mnemonic |
|---|---|---|
| ToolPackUpdateMessage( ){ | | |
| Message_tag | 8 | uimsbf |
| Message_length | 16 | uimsbf |
| Num_ToolPack | 8 | Uimsbf |
| For(i=0; i<Num_ToolPack; i++){ | | |
| ToolPackDescriptor( ) | | |
| } | | |
| } | | |

| Syntax | No. of bits | Mnemonic |
|---|---|---|
| ToolPackDescriptor( ){ | | |
| Descriptor_tag | 8 | uimsbf |
| Descriptor_length | 16 | uimsbf |
| ToolPackInfoDescriptor( ) | 8 | Uimsbf |
| ToolAgentDescriptor( ) | | |
| ToolGroupDescriptor( ) | | |
| Certificate | | |
| } | | |

| Syntax | No. of bits | Mnemonic |
|---|---|---|
| ToolPackInfoDescriptor( ){ | | |
| Descriptor_tag | 8 | uimsbf |
| Descriptor_length | 16 | uimsbf |
| ToolPackID | 128 | Uimsbf |
| ToolPackVersion | 8 | Uimsbf |
| ToolServerURL | | ByteArray |
| } | | |

| Syntax | No. of bits | Mnemonic |
|---|---|---|
| ToolAgentDescriptor( ){ | | |
| Descriptor_tag | 8 | uimsbf |
| Descriptor_length | 16 | uimsbf |
| ToolAgentBody | | ByteArray |
| } | | |

| Syntax | No. of bits | Mnemonic |
|---|---|---|
| ToolGroupDescriptor( ){ | | |
| Descriptor_tag | 8 | uimsbf |
| Descriptor_length | 16 | uimsbf |
| ToolGroupBody | | ByteArray |
| } | | |

| Syntax | No. of bits | Mnemonic |
|---|---|---|
| ToolUpdateMessage( ){ | | |
| Message_tag | 8 | Uimsbf |
| Message_length | 16 | Uimsbf |
| Num_Tool | 8 | Uimsbf |
| For(i=0; i<Num_Tool; i++){ | | |
| ToolDescriptor( ) | | |
| } | | |
| } | | |

| Syntax | No. of bits | Mnemonic |
|---|---|---|
| ToolDescriptor( ){ | | |
| Descriptor_tag | 8 | Uimsbf |
| Descriptor_length | 16 | Uimsbf |
| ToolID | 128 | Uimsbf |
| ToolBody | | ByteArray |
| } | | |

| Syntax | No. of bits | Mnemonic |
|---|---|---|
| ToolPackDataUpdateMessage( ){ | | |
| Message_tag | 8 | Uimsbf |
| Message_length | 16 | Uimsbf |
| ToolPackDataDescriptor( ) | | |
| } | | |

| Syntax | No. of bits | Mnemonic |
|---|---|---|
| ToolPackDataDescriptor( ){ | | |
| Descriptor_tag | 8 | Uimsbf |
| Descriptor_length | 16 | Uimsbf |
| ToolPackInfoDescriptor( ) | | |
| ToolGroupDataDescriptor( ) | | |
| Signature | | ByteArray |
| } | | |

| Syntax | No. of bits | Mnemonic |
|---|---|---|
| ToolGroupDataDescriptor( ){ | | |
| Descriptor_tag | 8 | Uimsbf |
| Descriptor_length | 16 | Uimsbf |
| ToolGroupData | | ByteArray |
| } | | |

Exemplary Embodiment 3

In this exemplary embodiment, an example of an interface message structure between the IPMP terminal and the tool agent for allowing the tool pack structure of the first exemplary embodiment to be smoothly used in a content execution device that is compatible with the MPEG2 standard as shown in FIG. 6 will be described.

First, update of the tool pack data and a used tool pack update message will be described.

When the tool pack does not exist in the content execution device or when the tool pack in the content execution device needs to be updated, the broadcasting station may add a tool pack update related message to a broadcast stream and transmit it or may independently transmit the message over an IP network. The content execution device updates the tool pack through the received tool pack update message using the IPMP terminal.

The tool pack update task may be performed using a tool pack update message ToolPackUpdateMessage having a schema structure as shown in FIG. 14 and Table 6.

TABLE 6

| Element Name | Description |
|---|---|
| MessageID | A message ID of a tool pack update message |
| Version | a version of a tool pack update message |
| Update | This includes condition information for tool pack update. Ex) update time and server position |
| ToolPackDescriptor | Header information for a tool pack to be updated. A tool pack to be updated can be determined based on this information. |
| Signature | Element for confirming integrity and authentication for a tool pack update message |

That is, the tool pack update message ToolPackUpdateMessage includes a message identifier (ID) for identification as a message; a message version for indicating a version of an update message; tool pack update condition information including information needed to update the tool pack; a tool pack descriptor for specifying a tool pack to be updated; and a signature value for guaranteeing authenticity of the update message.

Tool pack data that is a group of initial values to be applied upon initiating the tool pack may need to be updated, instead of updating the overall tool pack as described above. The tool pack data update task may be performed using a tool pack update message TPDataUpdateMessage having a schema structure as shown in FIG. 15 and Table 7.

TABLE 7

| Element Name | Description |
|---|---|
| MessageID | A message ID of a tool pack data update message |
| Version | A version of a tool pack data update message |
| Update | This includes condition information for tool pack data update. Ex) update time and server position |
| ToolPackDescriptor | Header information for tool pack data to be updated. Tool pack data to be updated can be determined based on this information. |
| Signature | Element for confirming integrity and authentication for a tool pack data update message |

That is, the tool pack data update message TPDataUpdateMessage includes a message identifier (ID) for identification as a message; a message version for indicating a version of an update message; tool pack data update condition information containing information needed to update tool pack data; a tool pack data descriptor for specifying tool pack data to be updated; and a signature value for guaranteeing authenticity of the update message.

A method for executing content using the tool pack structure in the control unit (CPU) of the content execution device 200 according to the present invention will be summarized. The method includes the steps of determining and retrieving a tool pack to be used according to the type of content data to be executed; confirming a signature of the retrieved tool pack; activating a tool agent of the tool pack; leaving an execution task to the tool agent when a task performed by the tool agent reaches a necessary control point during execution of the content data; and receiving execution result data from the tool agent and performing a subsequent task.

In the case where somewhat low security is allowed, the step of confirming the tool pack signature may be omitted. Following the step of leaving the execution task to the tool agent, the tool agent may drive a necessary tool program to perform a content data execution task. Then, the step of performing a subsequent task may be performed.

The content execution method will be summarized with respect to inter-operation (based on the interface message) between the IPMP terminal and the activated tool agent of FIG. 6. The content execution method performed by the IPMP terminal and the activated tool agent includes the steps of retrieving a desired tool pack based on the type of content to be executed (S110); activating a tool agent of the retrieved tool pack (S120); authenticating the activated tool agent (S130); connecting necessary tools to each control point (S150); initializing the tools by applying tool pack data containing an initial value for the tools (S160); and executing the content (S170), as shown in FIG. 16.

The step of retrieving the tool pack (S110) may further include the step of loading the retrieved tool pack, in which the IPMP terminal retrieves the tool pack from the storage memory of the content execution device. The step of authenticating the tool agent (S130) may be replaced by the step of verifying a signature value included in the tool pack. However, it is preferable to apply mutual-authentication between the IPMP terminal and the tool agent in order to further enhance security, as shown in FIG. 16.

The method may further include, after the step of authenticating the tool agent (S130), a step (S140) of checking whether a common tool not included in the retrieved tool pack but in a common tool pool is required to execute the content, and loading the common tool stored in the storage memory of the content execution device via the IPMP terminal when the common tool is required.

The tool connecting step (S150) may be performed with respect to each control point shown in Table 1 and FIG. 6. In the tool initializing step (S160), the tool pack data having the structure of FIG. 3 may be applied. The content execution step (S170) may be performed when proper tool programs are connected to each control point of the content execution device shown in FIG. 6. The method may further include, after the content execution step (S170), step (S180) of disconnecting the tools from each control point.

An interface message to which the content execution method is applied and which can be used between the IPMP terminal and the tool agent in common to initialize and operate the tool pack will now be defined.

Interface message delivery is shown in FIG. 16. The interface message is defined in an extended form of the following message base class. An example of the base class and each message class will now be described.

1) Base Class
*Grammar

```
Aligned(8) expandable(2^28−1)Class MessageBaseClass{
  bit(8) Version;
  bit(32) Msg_ID;
  bit(16) Sender;
  bit(16) Recipient;
}
```

*Meaning
Version: A version of the message
Msg_ID: An ID of the message
Sender: An object sending the message
Recipient: An object receiving the message 2) Tool Pack Authentication Related Message The IPMP terminal uses the following messages for mutual-authentication with the tool pack. These messages are used between the IPMP terminal and the tool agent.

2-1) InitAuthentication: Initialize an Authentication Method for Tool Pack Authentication.

*Grammar

```
Class InitAuthentication extends MessageBaseClass
: bit(8) tag = InitAuthentication_tag
{
    bit (32)    ToolPack_ID;
    bit (8)     AuthType;
}
```

*Meaning

ToolPack_ID: This indicates an ID of a tool pack to be authenticated. When ID is 0, it indicates an IPMP terminal.

AuthType: Each value has a meaning as shown in Table 8:

TABLE 8

| AuthType value | Meaning |
| --- | --- |
| 0x00 | Forbidden |
| 0x01 | Authentication is not required |
| 0x02 | ID authentication is not required. A secure channel is required |
| 0x03 | ID authentication is required. A secure channel is not required |
| 0x04 | ID authentication is required. A secure channel is required. |
| 0x05 0xFE | Reserved |
| 0xFF | Forbidden |

2-2) MutualAuthentication: a Message for Performing Mutual-Authentication Between the Tool Pack and the IPMP Terminal

*Grammar

```
Class MutualAuthentication extends MessageBaseClass
: bit(8) tag=MutualAuthentication_tag;
{
    bit (1)    requestNegotiation;
    bit (1)    successNegotiation;
    bit (1)    failedNegotiation;
    bit (1)    inclAuthenticationData
    bit (1)    inclAuthCodes;
    const bit (3) reserved = 0b000;
    if (requestNegotiation) {
        bit(8)                      nCandidateAlgorithm;
        AlgorithmDesciptor          candidateAlgorithms[nCandidateAlgorithm];
    }
    if (successNegotiation) {
        bit(8)                      nAgreedAlgorithm;
        AlgorithmDescriptor         agreedAlgorithms[nAgreedAlgorithm];
    }
    if (inclAuthenticationData) {
        ByteArray                   AuthenticationData
    }
    if (inclAuthCodes) {
        bit(8)    type;
        if (type == 0x01) {
            bit(8)                  nCertificate;
            bit(8)                  certType;
            ByteArray               certificates[nCertificate];
        } elseif (type == 0x02) {
            KeyDescriptor           publicKey;
        } elseif (type == 0xFE) {
            ByteArray               opaque;
        }
```

-continued

```
        ByteArray                   authCodes;
    }
}
```

*Meaning requestNegotiation: This is set to "1" upon requesting negotiation with a receiving object over an authentication method. In this case, an authentication method used in a transmitting object side is described in the message.

successNegotiation: This is set to "1" when the negotiation over the authentication method is successful. In this case, the negotiated authentication method is described in the message.

failedNegotiation: This is set to "1" when the negotiation over the authentication method is failed.

inclAuthenticationData: This is set to "1" when an opaque type of information needed for authentication is included in the message.

inclAuthCode: This is set to "1" when a code needed for authentication is included in the message.

type: This denotes a type value of an authentication code. The type value has a meaning as shown in Table 9.

TABLE 9

| Type value | Meaning |
| --- | --- |
| 0x00 | A defined type value is not used |
| 0x01 | This indicates that a value of authCodes is a digital signature value. One or more SPKI certificates or x.509 V3 certificates are included as a method for verifying a signature (according to cerType value). |
| 0x02 | This denotes that a value of authCodes is a digital signature value. An algorithm and a public key are included to confirm the signature. |
| 0x03 0xDF | ISO Reserved |
| 0xE0 0xFD | User Private |
| 0xFE | An application-independent method is used. Opaque data is used for authentication |
| 0xFF | Forbidden | cerType: This denotes a type of the certificate and has a value defined by a certificate issuing authority authCodes: This denotes an authentication code and has a value defined by the above type.

ByteArray type: This denotes a string or byte array. A class structure is shown below:

```
expandable class ByteArray
{
    bit(8) data[sizeOfInstance( )];
}
```

AlgorithmDescriptor type: This is a type extended from BaseAuthenticationDescriptor.

2-3) BaseAuthenticationDescriptor: A Top Class for Defining a Variable Type Related to an Authentication Message.

*Grammar

```
abstract aligned(8) expandable(2^28 −1) class
BaseAuthenticationDescriptor : bit(8) tag=0
{
    // empty. To be filled by classes extending this class.
}
```

*Meaning

In the top class, extended descriptors are shown in Table 10.

regAlgoID: ID assigned by the registration authority specAlgoID: ID assigned according to the MPEG-2 IPMPX specification and defined as shown in Table 11.

TABLE 11

| SpecAlgoID | Content | Confidentiality | Integrity |
| --- | --- | --- | --- |
| DH-G-H-x-y | Diffie-Hellman Key Agreement Scheme on a base group G. The parameter setting of the both parties is specified in certificates. | No | Yes |
| EDH-G-H-x-y | Ephemeral Diffie-Hellman Key Agreement Scheme on a base group G. Both parties are assumed to agree on the base group G, and each party is supposed to generate ephemeral parameters a public key pair for the purpose of authentication and the parameters are submitted being signed by the party. A certificate of the party is used for the opponent party to verify the signature. | No | Yes |
| DH-G-E-H-x-y-z | DH-G-H-x-y being used in combination with a symmetric key cipher algorithm E. | Yes | Yes |
| EDH-G-E-H-x-y-z | EDH-G-H-x-y being used in combination with a symmetric key cipher algorithm E. | Yes | Yes |
| RSA-OAEP-H-x | Needham-Schroeder Scheme deploying RSA-based OAEP as the public key encryption. | No | Yes |
| RSA-OAEP-E-H-x-z | RSA-OAEP-H-x being used in combination with a symmetric key cipher algorithm E. | Yes | Yes |
| SCHNRR-G-x-y | Schnorr Identification Scheme on a base group G. | No | No |

TABLE 10

| | |
| --- | --- |
| 0x00 | Forbidden |
| 0x01 | IPMP_AlgorithmDescr_tag |
| 0x02 | IPMP_KeyDescr_tag |
| 0x03-0x7F | ISO Reserved |
| 0x7F-0xFE | User defined |
| 0xFF | Forbidden |

2-4) AlgorithmDescriptor: A Descriptor for Describing Information About an Algorithm Applied to Authentication

*Grammar

```
class AlgorithmDescriptor extends BaseAuthenticationDescriptor:
bit(8) tag = IPMP_AlgorithmDescr_tag
{
    bit (1)    isRegistered;
    const bit (7)   reserved = 0b0000.000;
    if (isRegistered) {
        bit (16)         regAlgoID;
    }
    else {
        ByteArray        specAlgoID;
    }
    ByteArray OpaqueData;
}
```

*Meaning is Registered: This is set to "0" in case of a algorithm registered by authority. It is set to "1" when an algorithm is assigned by a registration authority.

In Table 11, each variable of ID has a meaning as shown in Table 12.

TABLE 12

| Variable | Definition |
| --- | --- |
| G | Specifies the type of a base group, e.g., a sub-groups of an elliptic curve |
| E | Specifies a symmetric key cipher algorithm to realize confidentiality of messages. |
| H | Specifies a hash function to realize message integrity, the hash function to be used being SHA-1. |
| X | Specifies the size of a base field, e.g., the length in bits of the base field of an elliptic curve. |
| Y | Specifies a size of the order of the base group, e.g., the length in bits of the order of a base group. |
| Z | Specifies the length in bits of a symmetric key cipher to be used. |

Here, when the H value is set, a message integrity check is required at both sides. In this case, the message contains a message authentication code (MAC). The use of the MAC is optional. The MAC is obtained by a hash function indicated in the variable H, and secret information shared between both sides is used as a key. The MAC is obtained as follows:

$$MAC = H(H(Shared\_Secret) | Message | H(Shared\_Secret))$$

2-5) KeyDescriptor: A Descriptor for Describing Information About a Key Applied to the Authentication

*Grammar

```
class KeyDescriptor extends AlgorithmDescriptor :
bit(8) tag = IPMP_KeyDescr_tag
{
    ByteArray    keyBody;
}
```

*Meaning
keyBody: This indicates a key value. For example, when the encryption algorithm is an RSA, a keyBody value will be BER encoded data.

```
RSAPublicKey ::=
        SEQUENCE {
            modulus         INTEGER, -- n
            publicExponent  INTEGER -- e
        }
```

3) Tool Pack Initiation Related Message

When mutual authentication between the IPMP terminal and the tool pack is completed, a task for initializing the tool agent is initiated.

3-1) ConnectToolPack: The IPMP terminal first delivers a control point list to the tool agent so that the tool agent connects the tools in the tool group to proper control points.
*Grammar

```
Class ConnectToolPack extends MessageBase
: bit(8) tag = ConnectToolPack_tag
{
bit(8)numControlPoints
for(i=0;i<numControlPoints;i++){
bit(8)ControlPointType;
ByteArray ControlPointAddress;
}
ByteArray Data;
}
```

*Meaning
numControlPoints: This denotes the number of control points.
ControlPointType: This denotes a control point index value. See Chap. 3, Sec. 1 for details.
ControlPointAddress: This denotes an instance address value of a control point. It indicates a point to which each tool is to be connected.
Data: Other necessary data may be included.

3-2) GetToolPackData: Parameter information used for the tool agent to initialize the tools in the tool group is described in the tool pack data. Accordingly, the tool agent requests the IPMP terminal to provide the tool pack data in order to initialize the tools in the tool group.
*Grammar

```
Class GetToolPackData extends MessageBase
: bit(8) tag = GetToolPackData_tag
{
}
```

3-3) SendToolPackData: The IPMP terminal extracts tool pack data from a broadcast stream or IP packet and delivers it to the tool agent. The IPMP terminal may deliver the tool pack data to the tool agent in response to a request from the tool agent or may directly deliver the tool pack data to the tool agent through an external ToolPackDataUpdate message. The tool pack data may be needed when an initial tool pack is initialized, and new tool pack data may be delivered by the IPMP terminal while a tool pack operates.
*Grammar

```
Class SendToolPackData extends MessageBase
: bit(8) tag = SendToolPackData_tag
{
ToolPackDataDescriptor ToolPackData;
ByteArray Data;
}
```

*Meaning
ToolPackData: This denotes tool pack data.
Data: Other necessary data may be included.

3-4) GettoolInstances: When a necessary tool does not exist in the tool group, the tool agent may request the IPMP terminal to retrieve a tool (common tool pool).
*Grammar

```
Class GetToolInstances extends MessageBase
: bit(8) tag = GetToolInstances_tag
{
bit(8)numTools;
for(i=0;i<numTools;i++){
bit (128) ToolID;
}
}
```

*Meaning
numTools: This denotes the number of tools to be retrieved.
ToolID: This denotes an ID of tools to be retrieved.

3-5) GettoolInstancesResponse: The IPMP terminal retrieves a requested tool from the common tool pool in response to a tool retrieval request from the tool agent and responds with a retrieval result to the tool agent.
*Grammar

```
Class GetToolInstancesResponse extends MessageBase
: bit(8) tag = GetToolInstancesResponse_tag
{
bit(8)numTools;
for(i=0;i<numTools;i++){
bit (128) ToolID;
ByteArray ToolInstance;
}
}
```

*Meaning
numTools: This denotes the number of retrieved tools.
ToolID: This denotes an ID of the retrieved tool.
ToolInstance: This denotes a tool instance of a retrieved tool.

4) Event Notification Message

Since the tool agent notifies the IPMP terminal of events occurring in the tool pack, the IPMP terminal needs to perform proper processing.

4-1) NotifyToolPackEvent: The tool agent delivers an event occurring in tool pack initialization and tool pack operation to the IPMP terminal so that the event is properly processed.

*Grammar

```
Class NotifyToolPackEvent extends MessageBase
: bit(8) tag = NotifyToolPackEvent __tag
{
bit(8)EventType
}
```

*Meaning

EventType: This denotes the type of an event that the tool agent will deliver to the IPMP terminal. Each value has an event meaning as indicated in Table 13.

TABLE 13

| Event value | Meaning |
| --- | --- |
| 0x00 | Connection to a control point is successful |
| 0x01 | Connection to a control point is failed |
| 0x02 | Disconnection from a control point is successful |
| 0x03 | Disconnection from a control point is failed |
| 0x04 | Interpretation of tool pack data is successful |
| 0x05 | Interpretation of tool pack data is failed |
| 0x06 | Tool pack cannot be processed |
| 0x08~0xC0 | Reserved |
| 0xC1~0xFF | User Defined |

5) Tool Pack Termination Related Message

When content playback is completed or other reasons exist, the IPMP terminal can instruct the tool agent to terminate tool pack operation.

5-1) DisconnectToolPack: A message that the IPMP terminal sends to the tool agent in order to disconnect each tool in the tool group from the control point.

*Grammar

```
Class DisconnectToolPack extends MessageBase
: bit(8) tag = DisconnectToolPack__tag
{
ByteArray Data;
}
```

*Meaning

Data: Other necessary data may be included.

Meanwhile, the IPMP terminal or the tool agent may need to directly obtain information from the user. In this case, the following user interface messages are used:

1) IPMP_UserQuery

A message used for displaying a query to the user in order to obtain necessary information from the user

*Grammar

```
class UserQuery extends IPMP__Data__BaseClass:
bit(8) tag = IPMP__UserQuery__tag
{
    bit(1)    inclDisplayTitle;
      bit(1)                    inclDisplayText;
    bit(1)                  needReplyText;
      bit(1)                inclOptionSelect;
      bit(1)                inclSMIL;
      const bit(3)     reserved = 0b000;
    bit(24)           numOfAltText;
    for(int i=0; i< numOfAltText; i++)
    {
          bit(24)                 languageCode;
          if   (inclDisplayTitle) {
              ByteArray         titleText;
    }
    if   (inclDisplayText) {
          bit(8)            nDisplayText;
          DTArray           displayText[nDisplayText];
    }
    if   (needReplyText) {
          bit(8)            nPromptText;
          QTArray           promptText[nPromptText];
    }
    if   (inclOptionSelect) {
          bit(8)            nOption;
          OptionArray       option[nOption];
    }
    if (inclSMIL) {
    bit(1)      isReferenced;
    const bit(7)  reserved = 0b0000.000;
                              if (isReferenced){
                                              ByteArray
SMIL__URL;
                }
          else {
                                              ByteArray
                                              SMIL;
          }
    }
    }
}
```

*Meaning

LanguageCode: A language code defined in the ISO 639-2:1998 bibliographic.

titleText: A title to be displayed displayText: Text to be displayed to the user meedReplyText: Text to be input by the user promtText: A text field indicating what is input to a user input portion. Ex: user ID, password, PIN, etc.

inclOptionSelect: An option field to be input by a user.

is Exclusive: An inter-exclusive option between one or more options when the options are associated with each other.

optionText: Text indicating meanings of the options. Ex: one month purchase, one time play, render at 1024/768, etc.

SMIL_URL: An element indicating the position of an SMIL file

SMIL: This denotes an SMIL file to be displayed.

2) DTArray

*Grammar

```
class DTArray
{
    bit(16)    ID;
    ByteArray  displayText;
}
```

3) RTArray

*Grammar

```
class RTArray
{
    bit(16)    ID;
    bit(16)    SubID;
    ByteArray  promptText;
}
```

4) QTArray
*Grammar

```
class QTArray
{
        bit(16)         ID;
        bit(16)         SubID;
        bit(1)                  isHidden ;
        bit(7)                  0b0000.000 ;
        ByteArray  promptText;
}
```

5) OptionArray
*Grammar

```
class OptionArray
{
        bit(1)           isExclusive;
        const bit(7)     reserved = 0b0000.000;
        bit(16)          ID;
        bit(16)          SubID;
        ByteArray        promptText;
}
```

*Meaning
IsExclusive: When this set to "1," it defines an inter-exclusive option field
ID: Numeric ID for associating data with a specific serial number or other data
SubID: sub-ID group of the ID
promptText: Text to be displayed 6) IPMP_UserQueryResponse
*Grammar

```
class    aligned    (8)UserIPMP_UserQueryResponse    extends
IPMP_Data_BaseClass:
bit(8) tag = IPMP_UserQueryResponse_tag
{
        bit(1)                  inclReplyText;
        bit(1)                  inclOptionSelect;
     const bit(6)       reserved = 0b0000.00;
        bit(24)                 languageCode;
        if    (inclReplyText) {
                        bit(8)          nReplyText;
                RTArray         ReplyText[nReplyText];
                }
        if    (inclOptionSelect) {
                bit(16)                         numOfOptions;
                        for (i=0; i<numOfOptions; i++)
                        {
                                bit(1) optionResult;//   0b1 = TRUE,
0b0 = FALSE;
                        }
                }
}
```

*Meaning
replyText: Text input by the user.
optionResult: This is the same as replyText. However, all options need to be displayed and described in a predefined order.

A tool pack structure implemented in an XML schema form according to an exemplary embodiment of the present invention is as follows:

```
<?xml version="1.0" encoding="UTF-8"?>
<!-- edited with XMLSpy v2005 rel. 3 U http://www.altova.com by Paul LEE ASKOR -->
    <xsd:schema    xmlns:xsd="http://www.w3.org/2001/XMLSchema"
xmlns:dsig="http://www.w3.org/2000/09/xmldsig#"
xmlns:dmptp="urn:dmp:Represent:ToolPack:2005:09-DMP-RT-NS"
targetNamespace="urn:dmp:Represent:ToolPack:2005:09-DMP-RT-NS"
elementFormDefault="qualified" attributeFormDefault="unqualified">
        <xsd:import     namespace="http://www.w3.org/2000/09/xmldsig#"
schemaLocation="http://www.w3.org/TR/2002/REC-xmldsig-core-
20020212/xmldsig-core-schema.xsd"/>
        <!-- elements -->
        <xsd:element name="ToolPack" type="dmptp:ToolPackType"/>
        <xsd:element                     name="ToolPackInfo"
type="dmptp:ToolPackInfoType"/>
        <xsd:element name="Pack" type="dmptp:PackType"/>
        <xsd:element name="ToolAgent" type="dmptp:ToolAgentType"/>
        <xsd:element name="toolGroup" type="dmptp:toolGroupType"/>
        <xsd:element                     name="SupportedPlatform"
type="dmptp:SupportedPlatformType"/>
        <xsd:element                     name="ToolPackDataInfo"
type="dmptp:ToolPackDataInfoType"/>
        <xsd:element                     name="ToolPackData"
type="dmptp:ToolPackDataType"/>
        <!-- complex types -->
        <!-- ToolPackType -->
        <xsd:complexType name="ToolPackType">
                <xsd:sequence>
                        <xsd:element             name="ToolPackInfo"
type="dmptp:ToolPackInfoType" minOccurs="0"/>
                        <xsd:element             name="ToolPackDataInfo"
type="dmptp:ToolPackDataInfoType" minOccurs="0"/>
                        <xsd:element ref="dsig:Signature" minOccurs="0"/>
                </xsd:sequence>
        </xsd:complexType>
        <!-- ToolPackInfoType -->
        <xsd:complexType name="ToolPackInfoType">
                <xsd:sequence>
                        <xsd:element                    name="ToolPackID"
```

```
type="xsd:anyURI"/>
                <xsd:element name="Pack" type="dmptp:PackType"
maxOccurs="unbounded"/>
                <xsd:element ref="dsig:Signature" minOccurs="0"/>
            </xsd:sequence>
        </xsd:complexType>
        <!-- PackType -->
        <xsd:complexType name="PackType">
            <xsd:sequence>
                <xsd:element               name="ToolAgent"
type="dmptp:ToolAgentType"/>
                <xsd:element               name="toolGroup"
type="dmptp:toolGroupType"/>
                <xsd:element               name="SupportedPlatform"
type="dmptp:SupportedPlatformType"/>
                <xsd:element ref="dsig:Signature" minOccurs="0"/>
            </xsd:sequence>
            <xsd:attribute name="number" type="xsd:decimal"/>
        </xsd:complexType>
        <!-- ToolAgentType -->
        <xsd:complexType name="ToolAgentType">
            <xsd:sequence>
                <xsd:element               name="ToolAgentID"
type="xsd:anyURI"/>
                <xsd:choice>
                    <xsd:element           name="Remote"
type="xsd:anyURI"/>
                    <xsd:element           name="Inline"
type="xsd:base64Binary"/>
                </xsd:choice>
                <xsd:element ref="dsig:Signature" minOccurs="0"/>
            </xsd:sequence>
        </xsd:complexType>
        <!-- toolGroupType -->
        <xsd:complexType name="toolGroupType">
            <xsd:sequence>
                <xsd:element               name="toolGroupID"
type="xsd:anyURI"/>
                <xsd:choice>
                    <xsd:element           name="Remote"
type="xsd:anyURI"/>
                    <xsd:element           name="Inline"
type="xsd:base64Binary"/>
                </xsd:choice>
                <xsd:element ref="dsig:Signature" minOccurs="0"/>
            </xsd:sequence>
        </xsd:complexType>
        <!-- SupportedPlatformType -->
        <xsd:complexType name="SupportedPlatformType" mixed="true">
            <xsd:sequence>
                <xsd:any namespace="##any" processContents="lax"
minOccurs="0"/>
            </xsd:sequence>
        </xsd:complexType>
        <!-- ToolPackDataInfoType -->
        <xsd:complexType name="ToolPackDataInfoType">
            <xsd:sequence>
                <xsd:element               name="ToolPackRefID"
type="xsd:anyURI"/>
                <xsd:element               name="ToolPackData"
type="dmptp:ToolPackDataType"/>
                <xsd:element ref="dsig:Signature" minOccurs="0"/>
            </xsd:sequence>
        </xsd:complexType>
        <!-- ToolPackDataType -->
        <xsd:complexType name="ToolPackDataType">
            <xsd:sequence>
                <xsd:any  namespace="##any" processContents="lax"
minOccurs="0"/>
            </xsd:sequence>
        </xsd:complexType>
    </xsd:schema>
```

An example of a tool pack structure concretely implemented in XML schema form is as follows:

```xml
<?xml version="1.0" encoding="UTF-8"?>
<dmptp:ToolPack xmlns="http://www.w3.org/2001/XMLSchema":xsi="http://www.w3.org/2001/XMLSchema-instance":dmptp="urn:dmp:Represent:ToolPack:2005:09-DMP-RT-NS":schemaLocation="urn:dmp:Represent:ToolPack:2005:09-DMP-RT-NS dmptp.xsd">
    <dmptp:ToolPackInfo>
    <dmptp:ToolPackID>urn:dmp:Represent:ToolPack:2005:001</dmptp:ToolPackID>
        <dmptp:Pack number="1">
            <dmptp:ToolAgent>
    <dmptp:ToolAgentID>urn:dmp:Represent:ToolAgent:2005:001</dmptp:ToolAgentID>
    <dmptp:Remote>http://www.etri.re.kr/ETRItoolagent001.dll</dmptp:Remote>
            </dmptp:ToolAgent>
            <dmptp:toolGroup>
    <dmptp:toolGroupID>urn:dmp:Represent:toolGroup:2005:001</dmptp:toolGroupID>
    <dmptp:Remote>http://www.etri.re.kr/ETRItoolgroup001.dll</dmptp:Remote>
            </dmptp:toolGroup>
            <dmptp:SupportedPlatform xmlns:mpeg4ipmp="urn:mpeg:mpeg4:IPMPSchema:2002">
                <mpeg4ipmp:TerminalID>
                    <mpeg4ipmp:OperatingSystem>
                        <mpeg4ipmp:Vendor>Microsoft Corporation</mpeg4ipmp:Vendor>
                        <mpeg4ipmp:Model>Windows XP Professional</mpeg4ipmp:Model>
    <mpeg4ipmp:Version>SP2</mpeg4ipmp:Version>
                    </mpeg4ipmp:OperatingSystem>
                </mpeg4ipmp:TerminalID>
            </dmptp:SupportedPlatform>
        </dmptp:Pack>
        <dmptp:Pack number="2">
            <dmptp:ToolAgent>
    <dmptp:ToolAgentID>urn:dmp:Represent:ToolAgent:2005:002</dmptp:ToolAgentID>
                <dmptp:Inline>0xfea001</dmptp:Inline>
            </dmptp:ToolAgent>
            <dmptp:toolGroup>
    <dmptp:toolGroupID>urn:dmp:Represent:toolGroup:2005:002</dmptp:toolGroupID>
                <dmptp:Inline>0xfea001</dmptp:Inline>
            </dmptp:toolGroup>
            <dmptp:SupportedPlatform xmlns:mpeg4ipmp="urn:mpeg:mpeg4:IPMPSchema:2002">
                <mpeg4ipmp:TerminalID>
                    <mpeg4ipmp:OperatingSystem>
                        <mpeg4ipmp:Vendor>Redhat Corporation</mpeg4ipmp:Vendor>
    <mpeg4ipmp:Model>Linux</mpeg4ipmp:Model>
    <mpeg4ipmp:Version>7.0</mpeg4ipmp:Version>
                    </mpeg4ipmp:OperatingSystem>
                </mpeg4ipmp:TerminalID>
            </dmptp:SupportedPlatform>
        </dmptp:Pack>
        <dmptp:Pack number="3">
            <dmptp:ToolAgent>
    <dmptp:ToolAgentID>urn:dmp:Represent:ToolAgent:2005:003</dmptp:ToolAgentID>
                <dmptp:Inline>0xfea001</dmptp:Inline>
            </dmptp:ToolAgent>
            <dmptp:toolGroup>
    <dmptp:toolGroupID>urn:dmp:Represent:toolGroup:2005:003</dmptp:toolGroupID>
    <dmptp:Remote>http://www.etri.re.kr/ETRItoolgroup003.dll</dmptp:Remote>
            </dmptp:toolGroup>
            <dmptp:SupportedPlatform xmlns:mpeg4ipmp="urn:mpeg:mpeg4:IPMPSchema:2002">
                <mpeg4ipmp:TerminalID>
                    <mpeg4ipmp:OperatingSystem>
                        <mpeg4ipmp:Vendor>Microsoft Corporation</mpeg4ipmp:Vendor>
                        <mpeg4ipmp:Model>Windows CE</mpeg4ipmp:Model>
    <mpeg4ipmp:Version>2.0</mpeg4ipmp:Version>
                    </mpeg4ipmp:OperatingSystem>
                </mpeg4ipmp:TerminalID>
            </dmptp:SupportedPlatform>
        </dmptp:Pack>
    </dmptp:ToolPackInfo>
```

```
<dmptp:ToolPackDataInfo>
    <dmptp:ToolPackRefID>urn:dmp:Represent:ToolPack:2005:001</dmptp:ToolPackRefID>
        <dmptp:ToolPackData>
            <!-- any namespace schema can be descibed here!! -->
        </dmptp:ToolPackData>
</dmptp:ToolPackDataInfo>
</dmptp:ToolPack>
```

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A non-transitory computer-readable medium, having recorded thereon a unit tool pack structure comprising:
    unit tool pack information;
    a common tool storage unit for storing a common tool program code having an open execution specification and processing the content data according to a unique rule; and
    a tool pack storage unit for storing a tool program code activated by a tool agent for processing the content data according to a unique rule and program code of the tool agent, wherein a content execution device calls the tool agent, and the tool program code is only called by the tool agent,
        wherein the tool pack storage unit includes a tool pack structure recorded thereon, the tool pack structure comprising:
            a signature value for guaranteeing authenticity of a tool pack;
            platform information indicating information about hardware in which the tool pack can be used;
            a tool pack agent that is a program activated for content execution; and
            a tool group including one or more undisclosed tool programs activated by the tool pack agent for processing the content according to a predetermined rule,
        wherein the undisclosed tool programs are packaged in the unit tool pack structure, and disclosed tool programs are stored in a common tool pool separate from the unit tool pack structure.

2. The unit tool pack structure of claim 1, wherein the unit tool pack information is platform information indicating information about hardware in which a unit tool pack can be used.

3. The unit tool pack structure of claim 1, wherein the tool agent comprises:
    an agent identifier for identifying the tool agent;
    a remote pointer indicating a location from which the tool agent can be downloaded; and
    a binary execution code of the tool agent.

4. The unit tool pack structure of claim 3, further comprising a signature value for guaranteeing the authenticity of the tool agent.

5. The unit tool pack structure of claim 1, wherein the tool group comprises:
    a group identifier for identifying the tool group;
    a remote pointer indicating a location from which the tool group can be downloaded; and
    a binary execution code of a tool program in the tool group.

6. The unit tool pack structure of claim 5, further comprising a signature value for guaranteeing authenticity of the tool group.

7. The unit tool pack structure of claim 1, wherein an operation interface specification of the tool agent is disclosed to the public, and
    an operation interface specification of the tool program is concealed in the operation of the tool agent.

8. A non-transitory computer-readable medium, having recorded thereon a tool pack structure comprising:
    a common tool storage unit for storing a common tool program code having an open execution specification and processing the content data according to a unique rule; and
    a tool pack storage unit for storing a tool program code activated by the tool agent for processing the content data according to a unique rule and program code of the tool agent, wherein the device calls a tool agent, and the tool program code is only called by the tool agent,
        wherein the tool pack storage unit includes a tool pack structure recorded thereon, the tool pack structure comprising:
            a signature value for guaranteeing authenticity of a tool pack;
            platform information indicating information about hardware in which the tool pack can be used;
        a tool pack identifier for identifying the tool pack;
        at least one unit tool pack, the unit tool pack comprising:
            unit tool pack information;
            a tool pack agent that is a program activated for content execution; and
            a tool group including one or more undisclosed tool programs activated by the tool pack agent for processing the content according to a predetermined rule, wherein the undisclosed tool programs are packaged in the unit tool pack structure, and disclosed tool programs are stored in a common tool pool separate from the unit tool pack structure; and
        tool pack data containing initial values assigned when each unit tool pack is used.

9. The tool pack structure of claim 8, wherein each unit tool pack is provided according to a hardware platform.

10. A content execution device for receiving content data of a predetermined format, converting the content data according to the format, and executing the content, the device comprising:
    a tool agent executer for activating a tool agent corresponding to the type of content data to be processed;
    a common tool storage unit for storing a common tool program code having an open execution specification and processing the content data according to a unique rule; and
    a tool pack storage unit for storing a tool program code activated by the tool agent for processing the content data according to a unique rule and program code of the tool agent, wherein the device calls the tool agent, and the tool program code is only called by the tool agent, wherein the tool pack storage unit is a computer-readable recording medium having a tool pack structure recorded thereon, the tool pack structure comprising:

a signature value for guaranteeing authenticity of a tool pack;

platform information indicating information about hardware in which the tool pack can be used;

a tool pack agent that is a program activated for content execution; and a tool group including one or more undisclosed tool programs activated by the tool pack agent for processing content according to a predetermined rule, wherein the undisclosed programs are packaged in the unit tool pack structure separately from the common tool storage unit.

11. The device of claim 10, further comprising a content input unit for receiving external broadcast content, wherein the tool agent executer determines a tool pack to be used based on tool pack information contained in the broadcast content.

12. The device of claim 10, further comprising a pack manager for downloading a tool pack from an external tool server, storing it in the tool pack storage unit, and updating the stored tool pack.

13. The device of claim 10, wherein the activated tool agent calls and initializes necessary tool programs from a tool group managed by the activated tool agent, and connects operation of a controller of the content execution device with the called tool programs.

14. A computer implemented method for executing content data, comprising the steps of:

(a) determining and retrieving a tool pack to be used based on the type of the content data to be executed, the tool pack stored in a tool pack storage unit for storing a tool program code activated by the tool agent for processing the content data according to a unique rule and program code of the tool agent, wherein the device calls the tool agent, and the tool program code is only called by the tool agent, wherein the tool pack storage unit is a computer-readable recording medium having a tool pack structure recorded thereon, the tool pack structure comprising:

a signature value for guaranteeing authenticity of a tool pack;

platform information indicating information about hardware in which the tool pack can be used; and a tool group including one or more undisclosed tool programs activated by a tool pack agent for processing the content according to a predetermined rule, wherein the undisclosed tool programs are packaged in the tool pack, and common tool programs are stored in a common tool pool in a common tool storage unit separate from the tool pack, the common tool storage unit for storing a common tool program code having an open execution specification and processing the content data according to a unique rule;

(b) activating the tool agent of the tool pack, the tool agent stored in the memory;

(c) leaving an execution task to the tool agent when a task performed by the tool agent reaches a necessary control point during the execution of the content data;

(d) executing, by the tool agent, a necessary tool program to perform a content data execution task; and (e) receiving execution result data from the tool agent and performing a subsequent task.

15. A computer implemented method for executing content data comprising the steps of:

(a) retrieving a tool pack determined to be used based on the type of content to be executed, the tool pack stored in a tool pack storage unit for storing a tool program code activated by the tool agent for processing the content data according to a unique rule and program code of the tool agent, wherein the device calls the tool agent, and the tool program code is only called by the tool agent, wherein the tool pack storage unit is a computer-readable recording medium having a tool pack structure recorded thereon, the tool pack structure comprising:

a signature value for guaranteeing authenticity of a tool pack;

platform information indicating information about hardware in which the tool pack can be used; and a tool group including one or more undisclosed tools activated by the tool pack agent for processing the content according to a predetermined rule, wherein the undisclosed tools are packaged in the tool pack, and common tools are stored in a common tool pool in a common tool storage unit separate from the tool pack, the common tool storage unit for storing a common tool program code having an open execution specification and processing the content data according to a unique rule;

(b) activating the tool agent of the retrieved tool pack, the tool agent stored in the memory;

(c) connecting necessary tools among the tools to each control point;

(d) applying tool pack data containing initial values for the tools to initialize the tools; and (e) executing the content.

16. The method of claim 15, further comprising, before step (c), the step of loading a common tool needed for content execution from the common tool pool when there is no tool pack.

17. The method of claim 15, further comprising, after step (b), the step of authenticating the activated tool agent.

18. The method of claim 15, further comprising, after step (e), the step of disconnecting tools from the control point when the content execution is completed.

* * * * *